(12) United States Patent
Maim

(10) Patent No.: US 11,444,768 B2
(45) Date of Patent: Sep. 13, 2022

(54) SYSTEMS AND METHODS FOR MANAGING NETWORKED COMMITMENTS OF SECURE ENTITIES

(71) Applicant: Enrico Maim, Sceaux (FR)

(72) Inventor: Enrico Maim, Sceaux (FR)

(73) Assignee: Enrico Maim, Sceaux (FR)

( * ) Notice: Subject to any disclaimer, the term of this patent is extended or adjusted under 35 U.S.C. 154(b) by 104 days.

(21) Appl. No.: 16/894,961

(22) Filed: Jun. 8, 2020

(65) Prior Publication Data

US 2020/0374118 A1    Nov. 26, 2020

Related U.S. Application Data

(60) Division of application No. 15/662,855, filed on Jul. 28, 2017, now Pat. No. 10,715,326, which is a (Continued)

(30) Foreign Application Priority Data

Apr. 15, 2015  (FR) .................................... 15/53328
Sep. 4, 2015   (FR) .................................... 15/58244

(Continued)

(51) Int. Cl.
*H04L 9/32*      (2006.01)
*G06Q 20/06*   (2012.01)
(Continued)

(52) U.S. Cl.
CPC ............... *H04L 9/32* (2013.01); *G06F 21/31* (2013.01); *G06F 21/51* (2013.01); *G06F 21/57* (2013.01);
(Continued)

(58) Field of Classification Search
CPC ....... H04L 9/32; H04L 9/0643; H04L 9/3218; G06F 21/31; G06F 21/51; G06F 21/57;
(Continued)

(56) References Cited

U.S. PATENT DOCUMENTS 6,311,214 B1   10/2001   Rhoads
6,836,765 B1 * 12/2004  Sussman ................ G06Q 30/06
                                                                    709/203

(Continued)

FOREIGN PATENT DOCUMENTS

WO     WO2021140460     *   1/2021

OTHER PUBLICATIONS

Gurgens et al. "Security Evaluation of Scenarios Based on the TCG's TPM Specification." Computer Security—ESORICS 2007, Ed. Biskup et al. [Lecture Notes in Computer Science] Sep. 24, 2007, vol. 4734, pp. 438-453. XP019099831.

(Continued)

*Primary Examiner* — Dant B Shaifer Harriman
(74) *Attorney, Agent, or Firm* — Leason Ellis LLP

(57) ABSTRACT

The invention relates to a method of managing commitments between entities forming the nodes of a network, each entity being housed in a computer processing unit, characterized in that it comprises the following steps: establishing commitments (ENij) between commitment provider entities (Ei) and commitment beneficiary entities (Ej), one and the same entity being able to be both a commitment provider in relation to one or more other commitment beneficiary entities and a commitment beneficiary in relation to other commitment provider entities, upon the default of an commitment on the part of a defaulting commitment provider entity, noted from a beneficiary entity benefiting from this same commitment, communicating to the provider entity from said beneficiary entity, and at least one other entity (Continued)

(upstream entity) whose defaulting provider entity is beneficiary, an indication of default of a commitment, and, in response to this communication, altering at least one commitment whose defaulting provider entity is beneficiary. The invention is also aimed at various systems and methods capable, in a secure manner, of implementing programs or commitments which are executable at the level of a set of nodes of a network, for various applications.

15 Claims, 13 Drawing Sheets

Related U.S. Application Data continuation of application No. PCT/IB2016/050440, filed on Jan. 28, 2016.

(60) Provisional application No. 62/109,772, filed on Jan. 30, 2015.

(30) Foreign Application Priority Data

Dec. 24, 2015 (FR) ...................................... 15/63289
Jan. 15, 2016 (FR) ...................................... 16/50352

(51) Int. Cl.
| | |
|---|---|
| G06F 21/51 | (2013.01) |
| G06F 21/57 | (2013.01) |
| G06F 21/31 | (2013.01) |
| G06F 21/62 | (2013.01) |
| H04L 9/06 | (2006.01) |
| G06Q 20/22 | (2012.01) |
| G06F 21/34 | (2013.01) |

(52) U.S. Cl.
CPC ....... *G06F 21/6254* (2013.01); *G06Q 20/065* (2013.01); *H04L 9/0643* (2013.01); *G06F 21/34* (2013.01); *G06Q 20/223* (2013.01); *H04L 9/3218* (2013.01)

(58) Field of Classification Search
CPC ... G06F 21/6254; G06F 21/34; G06Q 20/065; G06Q 20/223

USPC ........................................................ 713/156
See application file for complete search history.

(56) References Cited

U.S. PATENT DOCUMENTS

| | | | |
|---|---|---|---|
| 7,188,282 B2 | 3/2007 | Walmsley | |
| 9,858,569 B2* | 1/2018 | Phan | ................. G06Q 20/3829 |
| 11,038,694 B1* | 6/2021 | Kleinman | ........... H04L 63/0853 |
| 2005/0177624 A1* | 8/2005 | Oswald | ................. H04L 67/104 |
| | | | 709/219 |
| 2005/0177745 A1 | 8/2005 | Oswald et al. | |
| 2005/0177853 A1 | 8/2005 | Williams et al. | |
| 2008/0262969 A1 | 10/2008 | Samid | |
| 2009/0198541 A1* | 8/2009 | Dolan | ................. G06Q 10/087 |
| | | | 705/29 |
| 2015/0269570 A1* | 9/2015 | Phan | ................. G06Q 20/3276 |
| | | | 705/71 |
| 2016/0028728 A1 | 1/2016 | Hampel et al. | |
| 2017/0331896 A1* | 11/2017 | Holloway | ............... H04L 67/04 |
| 2018/0095941 A1* | 4/2018 | Ciabarra, Jr. | ......... G06F 40/106 |
| 2019/0123911 A1 | 4/2019 | Riley | |
| 2019/0279204 A1* | 9/2019 | Norton | .................... H04L 9/006 |
| 2020/0342394 A1* | 10/2020 | Moore | ............... G06Q 20/3674 |
| 2021/0174292 A1* | 6/2021 | Barry | ................. G06F 16/2468 |
| 2021/0176040 A1* | 6/2021 | Barry | .................... H04L 9/3239 |
| 2021/0248653 A1* | 8/2021 | McKenzie | ........... G06F 21/645 |
| 2021/0281395 A1* | 9/2021 | Narayanaswami | ... H04L 9/3239 |

OTHER PUBLICATIONS

Gav Wood. "Ethereum Development Tutorial." GitHub. Ethereum Wiki. Updated on Jan. 13, 2015 (Jan. 13, 2015) XP055275247. Retrieved on May 25, 2016 from: https://github.com/ethereum/wiki/wiki/Ethereum-Development-Tutorial/0c1f501ea03a787910049b03723flbfd7a14c9c6.
Reiner et al. "Bitcoin Wallet Identity Verification Specification." Armory Technologies, Inc. Retrieved from: http://diyhpl.us/~bryan/papers2/bitcoin/armory-verisign-bitcoin-wallet-identity-specification.pdf. Feb. 27, 2015. 23 pages.
International Preliminary Report on Patentability in Corresponding PCT Application No. PCT/IB2016/050400 dated Aug. 1, 2017. 20 pages.
International Search Report and Written Opinion in Corresponding PCT Application No. PCT/IB2016/050400 dated Aug. 17, 2016.

\* cited by examiner

US 11,444,768 B2

SYSTEMS AND METHODS FOR MANAGING NETWORKED COMMITMENTS OF SECURE ENTITIES

FIELD OF THE INVENTION

This invention generally relates to identification and transaction methods and systems based on an architecture of peer-to-peer (P2P in the following) networked entities having digital processing capability. It particularly relates to systems and methods implementing entities identified by cryptographic keys and secure commitments and transactions of units of account transfer between such entities.

BACKGROUND OF THE INVENTION

Numerous systems and methods are known where keys (i.e. cryptographic public/private keys) are used as identities (public key for identifying an individual or a respective hardware device) and for signing commitments on behalf of these identities (private key).

In a known architecture, the keys are controlled by computer entities forming the nodes of a network, and (as far as the public keys are concerned), are communicated therein in peer-to-peer with attributes associated thereto.

In the common meaning, an identity can be materialized by a key if features (or attributes) are associated thereto and can be interpreted by humans, so that the identity represents a particular entity that can be recognized by its features. To a key can be associated for instance a photo, a name, an email address, a phone number, an organization or a department to which someone belongs, the role and management level in such organization, a distinctive sign, biometric data, a bank account identifier, a social security number, data of an electronic passport signed by a government, etc., or else a set of such features.

Also known are various secure processing architectures between different pieces of equipment, in particular those based on a blockchain.

Also known are secure system-on-chips, in particular for use in the Internet of Things.

SUMMARY OF THE INVENTION

The present invention aims at providing different systems and methods capable, in a secure manner, of implementing executable programs or commitments at a set of nodes of a network, for different applications.

In an implementation, the invention seeks to provide a transactional architecture base on a set of entities constituting the nodes of a network called "Wallet Nodes" (WN), capable of executing executable codes called "Wallet Programs" (WP) of any kind and interacting with each other via "Wallet Messages" (WM), and aiming at the users being able to trust each other as to the results of execution of their respective WN.

In this regard:
* they execute for their interactions the same executable codes;
* these executable codes can play the role of executable contracts formed of mutual commitments between the WNs, where
   the association between a WM and the WP which has generated and the fact that the message has not been altered are guaranteed,
   a WN executing a given WP accepts only WMs generated by the same given WP in another WN.

Another aim of the invention is to provide the implementation of this architecture, at will:
* in one or several centralized servers, with a guarantee of good execution at the server(s);
* by relying on contrats of the "Smart Contract"-type (as implemented e.g. on Ethereum), with a guarantee of good execution by the "Miners";
* in "systems-on-chip" (SoCs) for each of the WNs, with a signature of the WMs by the SoCs themselves;
* in the secure part of a processor, such as the "Trusted Execution Environment" (TEE).

Advantageously the invention, that can be implemented within various devices, phones, USB memory units, within objects of the IoT, etc., allows avoiding in certain applications the use of a unique and shared security chain of the "Blockchain"-type. For instance, for a WP transferring units of account between two WNs that maintain respective unit of account balances, the risk of a "double spend" (which has motivated the invention of the BitCoin blockchain) does not exist since the WM of the transfer at staked is not altered and since the WP is executed in a secure manner in both WNs (for respectively decrementing the balance of transferring WN and incrementing the balance of the WN to which the units are transferred).

In addition, for application that would require sequencing or prioritizing of actions, or establishing the proof of transmission of a WM at a given time or in relation to the time of transmission or reception of another message, one can also avoid the use of a chain of the "Blockchain" type by providing that the WNs have synced clocks (by using a protocol such as NTP) and that the WM are time-stamped in a secure manner by the WNs that transmit them and are recorded in a register (that can be central or partially decentralized or implemented in a Distributed Hash Table (DHT), for instance using a P2P protocol of the "Kademlia" type).

In particular, this invention aims at allowing the implementation of transactional protocols equivalent to BitCoin or its successors (such as Ethereum), with the above-mentioned register rather than with a blockchain, and thus without the need to wait for transaction confirmations (which, depending on the adopted approach, each require from around ten seconds to around ten minutes—order of magnitude) and with transactions volumes that are virtually unlimited (while Bitcoin is nowadays limited to about 7 transactions per second and while, by comparison, the Visa network is designed for operating with volume peaks of 10,000 transactions per second).

First of all, in a general manner for the well-known uses of cryptography, the invention aims at an approach based on P2P-recognized attributes for obtaining a usability which is superior to the one of the state of the art and for addressing the problem of lack of trust in relation with the current centralized and hierarchical public key infrastructures (in particular the users cannot evaluate the credibility of each of the numerous root certification authorities in their browsers).

In order to introduce a first aspect of the invention, it is observed that a commitment signed with a key is valuable only as long as this signature is not denied. Indeed, its owner can deny the commitment by alleging that the key is not his own key or was not under his control when the signing has been performed (key usurpation).

It is also observed that the reliability of a commitment signature can be perceived as what the signatory "would have to lose" from the financial and social standpoints if it was denied.

The invention thus aims, in a particular aspect, at making the commitments more reliable:

by generating, in case of a commitment failure, the proof of this failure and possibly the evidence of this commitment denial;

by then blocking the commitments for which the failing entity (and its responsible bodies, cf. in the following) are themselves the beneficiaries (after a grace period), as long as the connection between the liabilities of entities implemented in the invention and their legal consequences at the society level are not established.

According to a first aspect is provided a A method for managing commitments between entities forming the nodes of a network, each entity being hosted in a computer unit, characterized in that it comprises the following steps:

establishing commitments between commitment provider entities and commitment beneficiary entities, where a same entity can be both a commitment provider vis-a-vis one or several other commitment beneficiary entities and a commitment beneficiary vis-a-vis other commitment provider entities, upon a commitment failure from a failing commitment provider entity, detected from an entity which is beneficiary of the same commitment, communicating from said beneficiary entity to the provider entity and to at least another entity (upstream entity) whose failing provider entity is the beneficiary, a commitment failure indication, and in response to this communication, altering at least one commitment whose failing provider entity is the beneficiary.

This method comprises in a preferred but optional manner the following additional features, taken individually or in any technically compatible combinations:

* the commitments are established on the basis (i) of a recognition by the commitment beneficiary entity of an association between at least one attribute specific to the commitment provider entity and a encription key which is univocally associated to said commitment provider entity, and (ii) of a recognition by the commitment provider entity of an association between at least one attribute specific to the commitment beneficiary entity and an encryption key which is univocally associated to said commitment beneficiary entity.

* the alterations are executed selectively by comparing the attributes specific to the commitment provider entity that are recognized by the beneficiary entity and attributes of said provider entity that are specific to the latter in connection with the recognition of the association with its encryption key by commitment provider entities vis-a-vis itself (upstream entities) whose commitments are to be altered, in order to determine possible key usurpations.

* wherein said comparison comprises the detection of inconsistent information for a same attribute type, in which case a commitment towards the failing commitment provider entity is not altered.

* the attributes comprise strong attribute types designating entities in a unique manner and weak attribute types designating entities in a potentially non unique manner.

* the detection of inconsistent information comprises the detection of strong attributes that are different.

* the detection of inconsistent information comprises the determination of a consistency degree for a set of weak attributes.

* the alterations are executed as a function of unit of account values of the failing commitment and of commitments whose failing provider entity is the beneficiary.

* the method further comprises the determination, for each entity, of an exposure weight on the basis of an accretion of unit of account values for commitments whose entity is the beneficiary, said exposure weight being representative of a commitment failure risk.

According to a second aspect of the invention, there is proposed a method for determining reliability ratings of a set of entities forming the nodes of a network, each entity being hosted in a computer unit, wherein the entities are capable of being connected with each other by unidirectional or mutual identification processes on the basis of the recognition by an entity of an association between at least one attribute specific to the other entity and an encryption key that is univocally associated to said other entity, and wherein commitments between entities are capable of being generated, comprising the following steps:

determining a group of first entities that have implemented a strong mutual identification process, determining second entities each connected to at least one of the first entities by mutual identification processes, determining third entities connected to the second entities by processes of identification of the third entities by the second entities, on the basis of a count of the number of identifications performed by the second entities on the third entities, determining a reliability rating of the third entities for commitments by said third entities.

This method comprises in a preferred but optional manner the following additional features, taken individually or in any technically compatible combinations:

* the final step involves several counts performed separately for each of the attributes whose association is recognized.

* the method further comprises repeating the above method on the basis of a new group of first entities comprising the original first entities and the third entities, etc.

* the method further comprises the determination of authority ratings of the second entities based on a count of identifications performed by the latter.

* the count performed for determining the reliability ratings is weighed with the authority ratings.

According to a further aspect of the invention, it is provided a system for certifying goods in a logistic or transformation chain, wherein a tag capable of containing certifications performed at different stages of the chain is associated to each good, characterized in that the system comprises a set of pieces of equipment distributed on the chain and each provided with a wallet node (WN), and in that the wallet nodes each comprises a wallet program (WP) so as to securely perform:

a transfer of tag ownership from a wallet node to another (OWN), where only one wallet node can own a tag at a given time, a transfer of tag control from a wallet node to another (VWN), wherein only one wallet node can control a tag a given time, so as to certify both the authenticity of a good and its location in the chain.

In another system for certifying goods in a logistic or transformation chain, a tag capable of containing certifications performed at different stages of the chain is associated to each good, and the system comprises an equipment including means for storing in a tag data that are uniquely representative of physical, chemical or optical properties of the good on the basis of a corresponding analysis at said equipment of a region of the good where the tag is affixed, these data being subsequently accessible in order to check whether the tag has remained associated with the same good on the basis of identical or equivalent analyses.

Preferably but optionally in this system, the analysis is performed with a portable device, and further comprising means for positioning the portable device in a reference position relative to the good when the analysis is made with the device.

It is further provided according to the invention a system for managing commitments between entities having a digital processing capability and forming the nodes of a network, the nodes being connected by non-conditional commitments between commitment issuers and commitment acquirers, all commitment having values in common units of account, each node comprising a memory containing:
non-conditional commitment balances, issuer by issuer,
non conditional commitment amounts available for other nodes (Montants+) or sought from nodes (Montants−), issuer by issuer,
wherein units od account corresponding to commitments can be transferred between nodes, and the valances and amounts at the different nodes being recomputed accordingly,
wherein the nodes are also connected by conditional commitments of different types, where a conditional commitment is triggered in favor of a given beneficiary node when a certain triggering event occurs and requires a transfer of units of account to a certain node determined by the type of conditional commitment, and wherein different types of conditional commitment correspond to different types of triggering events,
wherein the memory of each node further contains:
balances of conditional commitments (CCC) for each conditional commitment type and for each issuer,
conditional commitment capabilities for each conditional commitment type and for each beneficiary node (E1), the system further comprising means capable, when a triggering event occurs, for transferring units of account between nodes according to the balance, amount and capability data currently stored in the nodes so as to perform all or part of the required transfer and for updating said data in the different nodes involved.

This system comprises in a preferred but optional manner the following additional features, taken individually or in any technically compatible combinations:
* the required transfer is at least partially implemented by consuming in one or several conditional commitment balances available for that purpose in the beneficiary node.
* a required transfer not entirely met by balance consumption is performed or completed by transferring units of account from one or several nodes that are conditional commitment providers vis-à-vis the beneficiary node (E1), depending on the conditional commitment balances at these provider nodes, said means being capable of updating said conditional commitment balances.
* a required transfer not entirely met by balance consumption and possibly by transfer of units of account from conditional commitment provider nodes is performed or completed by transferring units of account from other nodes (downstream nodes) that benefit from conditional commitments from the beneficiary node.
* a required transfer not entirely met by balance consumption and possibly by transfer of units of account from conditional commitment provider nodes, and possibly by transfer of units of account from downstream nodes, is performed or completed by transferring units of account from other nodes that also benefit from conditional commitments from the commitment provider nodes.
* the network of nodes is browsed toward other conditional commitment provider nodes at the upstream side and/or towards other conditional commitment beneficiary nodes at the downstream side until the required transfer has been performed entirely.
* a triggering event type is made of a commitment transfer from a first commitment provider to a second commitment provider, the required transfer of units of account being the one, from the first commitment provider to the second commitment provider, that should result from this commitment transfer for the value in units of account of this commitment.

It is further proposed a system for managing commitments between entities having a digital processing capability and forming the nodes of a network, the nodes being connected by non-conditional commitments between commitment issuers and commitment acquirers, all commitment having values in common units of account, each node comprising a memory containing:
commitment balances, issuer by issuer,
commitment amounts available for other nodes (Montants+) or sought from other nodes (Montants−), issuer by issuer,
wherein units of account corresponding to commitments can be transferred between nodes, and the balances and amounts at the different nodes are recomputed accordingly, and wherein the network of nodes constitutes a flow network where the flow capacities of segments between nodes are determined according to the available commitments and the sought commitments for a given issuer entity,
and wherein a transfer of units of account from a first entity to a second entity is implemented by the following steps:
if a commitment balance at the first entity for an issuer entity corresponding to the second entity is sufficient, performing the required transfer or units of account,
if this balance is insufficient, increasing the amount of sought commitments (Montant−) for this same issuer entity at least for the missing units of account,
executing a load balancing process of the flow network so as to meet all or part of this quest, and
performing or completing the transfer of units of account commensurately with the sought commitments which have been met by this balancing.

According to another aspect, it is provided a System-on-Chip (SoC), characterized it comprises in combination:
a processor (Microcontroller),
a subsystem of any executable codes (Wallet Programs) capable of being executed by the SoC and by other SoCs,
an executable code management subsystem (Check/Load) comprising a specific executable code for selecting/loading said any executable codes,
an input/output subsystem (I/O) allowing the SoC to communicate with other SoCs to exchange messages (Wallet Messages) with other SoCs, at least certain of these messages containing the hash of the content of an executable code, a signature subsystem (Sign) for the exchanged messages, capable of generating a hash of an executable code currently loaded in the SoC, the SoC being capable:
* in response to the reception of a message (Wallet Message) containing a hash, causing said specific selection/loading executable code to select and load for execution, from said any executable code subsystem (Wallet Programs), the any executable code whose content hash corresponds to said hash included in said message (Wallet Message);
* before signing a message (Wallet Message) to be issued, causing the signature subsystem (Sign) to generate or check the hash of the any executable code currently loaded for inclusion into said message, thus guaranteeing that the same hash is re-propagated from a received message to an issued message.

This system comprises in a preferred but optional manner a permanent memory for a set of state variables, only an executable code (Wallet Program) owning a state variable being capable of modifying it.

According to another aspect of the invention, it is proposed a System-on-Chip (SoC), characterized it comprises in combination:
a processor (Microcontroller),
a subsystem of any executable codes (Wallet Programs) capable of being executed by the SoC and by other SoCs,
an executable code management subsystem (Check/Load) comprising a specific executable code for selecting/loading said any executable codes,
an input/output subsystem (I/O) allowing the SoC to communicate with other SoCs to exchange messages (Wallet Messages) with other SoCs, at least certain of these messages containing an encrypted body and the hash of the content of an executable code,
a signature subsystem (Sign) for the exchanged messages, capable of generating a hash of an executable code currently loaded in the SoC, the SoC being capable:
* in response to the reception of a message (Wallet Message) containing a hash while a certain executable code (Wallet Program) is under execution by the processor or is about to be executed, decrypting the encrypted body of the received message only if the hash contained in the received message of the executable code under execution or to be executed; and
* before signing a message (Wallet Message) to be issued, causing the signature subsystem (Sign) to generate or check the hash of the any executable code currently loaded for inclusion into said message, thus guaranteeing that the same hash is re-propagated from a received message to an issued message.

It is further provided:
an encryption of the transmitted messages performed by the signature subsystem.
a use of at least one SoC as defined above for performing an anonymous identification from identity documents from which official signatures can be read.
a use of two SoCs as defined above to perform a transfer or units of value by debiting a balance (Balance) constituted by a state variable in one of the SoCs and crediting a balance constituted by a state variable in the other SoC.

In a preferred but optional manner, this use also involves at least one witness SoC associated to an identification or value transfer SoC and capable of replicating at least part of the operations executed in the latter.

It is further provided a data processing device, comprising processing and storage means and means for communications with other data processing devices, characterized in that it comprises a SoC as defined above and a wired or wireless bidirectional communications channel between the processing means and the SoC, the latter being capable of exchanging messages with other SoCs via said communications means of the device.

In an embodiment, the SoC is hosted in a unit which is distinct from the processing device.

In another embodiment, the SoC is integrated to the processing device.

According to still another aspect there is provided a system for the secure execution of programs in an architecture comprising a series of network-connected pieces of equipment, characterized in that it comprises, it at least one piece of equipment, a secure system-on-chip (SoC) in which a SoC private key is stored in a manner accessible only by the SoC,
wherein a SoC can communicate with another piece of equipment only via messages and being capable of executing programs only in response to the reception of messages,
wherein a SoC is capable of communicating to other pieces of equipment a SoC public key corresponding to said SoC private key and certified by the SoC manufacturer,
wherein a SoC is capable of storing at least one program for execution and of generating a hash of the or each program,
wherein the piece of equipment is further capable of transmitting to the SoC a message containing input data (input) for a program to be executed that are encrypted with said SoC public key, as well as the hash of said program, and another public key intended for encrypting the result of execution of said program on said input data, for decryption by another corresponding private key,
wherein the SoC is capable, in response to such a message containing input data, in a secure manner, of (i) checking that the hash of the program for execution on the input data once decrypted matches the hash received with said encrypted input data, (ii) decrypting the input data received from the piece of equipment, and (iii) only in case of a match between the hashes, executing the program, with the exclusion of any other instructions, on the input data once decrypted, with the exclusion of any other data, then encrypting the result of the execution with said other public key and transmitting the result thus encrypted, with the exclusion of any other result except possibly those provided by construction in the SoC, to the piece of equipment,
so as to ensure the continuous inaccessibility of the input data, of their processing and of the processing result.

This system preferably but optionally comprises the following additional features, taken individually or in any technically compatible combinations:
* the decryption of the encrypted input data is also performed only in case of match between the hashes
* a message containing a program for execution by the SoC also contains a hash of said program.
* the SoC is capable of erasing a program after execution.
* the hash received with the input data is used for designating a given program for execution among a set of programs stored in the SoC.
* the operations (i), (ii) et (iii) are implemented by the SoC with the exclusion of any other operation.
* the system comprises a plurality of SoCs capable of exchanging messages with each other, wherein each message contains a hash of a program to be executed by the SoC receiving this message.

* two SoCs are capable of executing two identical programs, this identity being guaranteed by the identity of hashes, wherein said programs are representative of mutual commitments between two entities associated to the SoCs.
* two SoCs are capable of executing two programs only if a match therebetween is established at the SoCs, this match being guaranteed by a match between hashes, wherein said corresponding programs being representative of mutual commitments between two entities associated to the SoCs.
* the match between hashes is guaranteed by a common specification stored in each SoC and by a hash of this specification which is contained in each message to and from the SoCs.

Finally it is provided according to the invention a method for the secure execution of programs in an architecture comprising a series of network-connected pieces of equipment, comprising in at least one piece of equipment a secure system-on-chip (SoC) in which a SoC private key is stored in a manner accessible only by the SoC, wherein a SoC can communicate with another piece of equipment only via messages and being capable of executing programs only in response to the reception of messages, a SoC being capable of communicating to other pieces of equipment a SoC public key corresponding to said SoC private key and certified by the SoC manufacturer, and wherein a SoC is capable of storing at least one program for execution and of generating a hash of the or each program, the method comprising the following steps:
  transmission by a piece of equipment to a SoC of a message containing input data (input) for a program to be executed, that are encrypted with said SoC public key, as well as the hash of the program, and another public key intended for encryption of the result of execution of said program on said input data, for decryption by means of another corresponding private key,
  in response to the reception of this message, implementation at the SoC, in a secure manner, of the following sub-steps:
    (i) checking that the hash of the program for execution on the input data once decrypted corresponds to the hash received with said encrypted input data,
    (ii) decrypting the input data received from the piece of equipment, and
    (iii) only in case of a match between the hashes, executing the program, with the exclusion of any other instructions, on the input data once decrypted, with the exclusion of any other data, then encrypting the result of execution with said other public key and transmitting the result thus encrypted, with the exclusion of any other result except possibly those provided by construction in the SoC, to the piece of equipment,
so as to ensure the continuous inaccessibility of the input data, of their processing and of the processing result. It is further provided a system for executing any "Wallet Program" executable codes (WP) by so-called "Wallet Nodes" (WN) of a network interacting with each other via "Wallet Messages" (WM), and aiming at the users being able to trust each other as to the results of execution of their respective WNs, each node comprising for that purpose a processor and a memory, characterized in that:
  two nodes can interact with each other only by executing at each node the same executable code,
  an executable code (WP) executed at a pair of nodes implements mutual commitments passed between said nodes,
  means are provided for guaranteeing that a given Wallet Message has been generated by a given executable code (WP),
  means are provided for guaranteeing the integrity of each wallet message, and
  a Wallet Node executing an executable code (WP) is capable of receiving as input only a Wallet Message generated by the same executable code (WP) in another node.

It is provided according to the invention a method for trusted execution of any executable codes (WP) by nodes (WN) of a network that mutually interact via messages (WM), comprising the following steps:
  * the nodes executes the same executable code for their interactions;
  * these executable codes play the role of executable contracts formed of mutual commitments between these nodes, where
    the association between a message and the executable code which has generated, and the fact that the message has not been altered, are guaranteed,
    a node executing a given executable code only accepts the messages generated by the same given executable code in another node.

BRIEF DESCRIPTION OF THE DRAWINGS

The invention will be better understood from the following description given with reference to the accompanying drawings in which.

The FIGS. 1A-D illustrate a process consisting in freezing the commitments of which a defective entity is beneficiary, The FIGS. 2A-F illustrate a method for executing Care Capacity Commitments.

DETAILED DESCRIPTION OF PREFERRED EMBODIMENTS

Plan

Figure 1A:
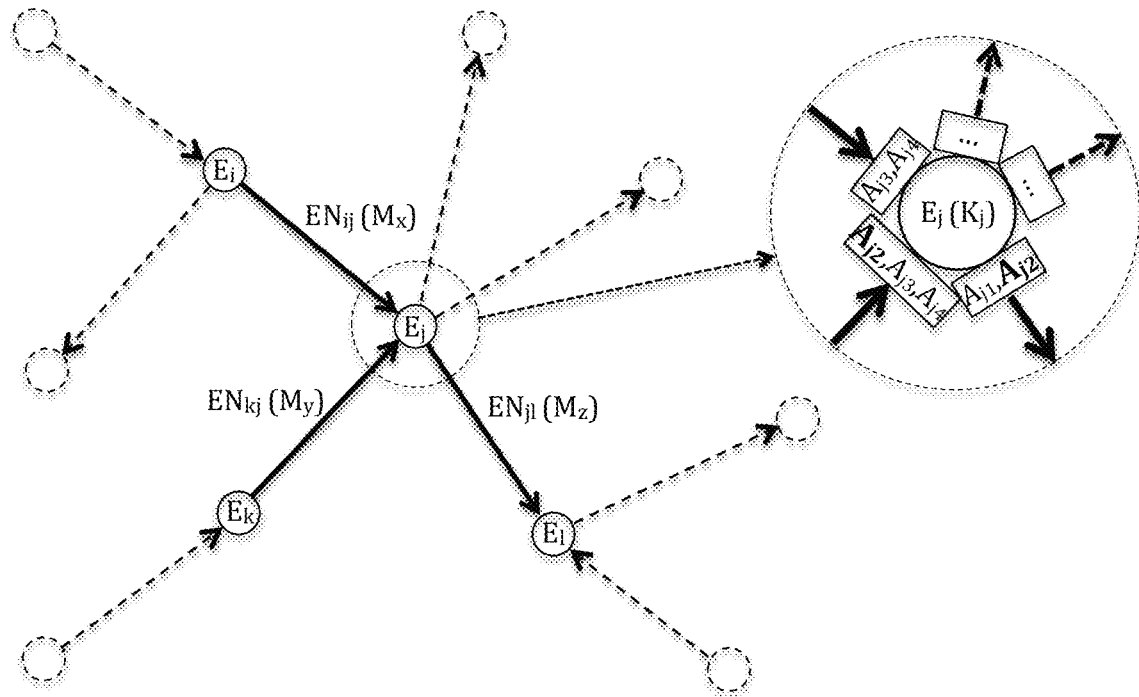

A number of uses of WN/WP/WM will first be described in the implementation of executable commitments, namely:
  * how entities embodied by WNs can represent individuals or devices belonging to them, the keys of these WNs being used to identify them, and how to reinforce their reliability of non-repudiation, without recourse to a certification authority;
* how entities embodied by WNs can ensure the traceability of products in a supply chain;
* how entities embodied by WNs may issue co-operation or mutual assistance commitments (engagements), particularly in the case of unexpected events;
* how commitments of entities can be used as commitments for the supply of goods or services, a commitment by a particular supplier being able to be used to be supplied by others.

(In the following description, the term "entity", "Wallet Node" or WN is used interchangeably to designate a Wallet Node. Furthermore, the term "user", except when explicitly speaking about a human user, will generally designate a device or a program that is associated with it. For example, an indication of the type "user A sends user B such data" will mean that "the device or program associated with user A sends such data to the device or program associated with user B". Finally, with respect to a given device or program, the term "user" may in some cases designate another device or program.)

Exchange of Public Keys

In order to be identified in a decentralized way, individuals can exchange their respective public keys directly, via their respective smart terminals, and confirm to each other the attributes associated with them. It is essential at this stage to protect oneself from an attack by an interposed person, called MitM («Man in the Middle attack»). An example of a method for two individuals to exchange their keys without risk of MitM (adaptable for n individuals) is the following:

1. A first user (and his terminal, for example a mobile phone) approaches another user and shows him a Nonce (a random number serving only once), presented in the form of a QR code generated in his Terminal from this Nonce.
2. The other user (who is nearby, using his terminal) photographs this QR code, interprets it to reconstitute that Nonce, calculates its hash (hash means the result of the application of a predetermined cryptographic hashing function) and returns to the first user its own public key in clear and its signature of said hash+ its own key. (Note that instead of—or in addition to—the QR code, a secret passphrase can be communicated by oral, this can be done by telephone if the other user is not nearby, and the other user calculates in his Terminal the hash of this passphrase instead of the hash of the Nonce, then returns it with its key and its signature.)
3. The first user's terminal checks the signature against the received key and the Nonce (or passphrase) and records the (public) key of the other user.
4. Insofar as their terminals are reliable (see "Wallet Node" below), both users can now communicate encrypted information (optionally by generating/using a common Symmetric key by Diffie-Hellman)—starting of course by the communication by the first user of his (public) key encrypted by means of the (public) key of the other user. These exchanges include other keys that each user could previously exchange using the same method.

Other methods also using an "out of band channel" approach (and also requiring the use of a reliable terminal) can be implemented to carry out this exchange of public keys avoiding the MitM, In particular the known SafeSlinger method, which is however more complex since it is designed to optimize the case where each of the users of a group (such as in a "key signing party") performs a key exchange with all other. The following link https://sparrow.ece.cmu.edu/group/pub/farb_safeslinger_mobicom2013.pdf is to the article describing the SafeSlinger process.

Key-Attribute Association

A given user having characterized her key by associating attributes, each attribute meaning "this key belongs to the one that has the attribute XXX"; other users, having exchanged their keys with her (as described above), can confirm these attributes by generating and (securely) sending a certificate to that given user: for example, to confirm the photo of the user, other users send her their respective signature of the hash of this photo. Such a certificate is stored at the terminal receiving it as a meta-attribute meaning "this key belongs to the one that has the attribute XXX recognized by the entity YYY", an entity representing an individual (and able to confirm one or more attributes at a time).

In addition, as described below, attribute recognition(s) can be performed in the presence of other users and generate a certificate (meta-attribute) meaning "this key belongs to the person who has the attribute XXX recognized by YYY in the presence of ZZZ . . . ".

Thus, to each attribute can be associated meta-attributes indicating their recognitions by other entities.

According to a particular aspect (also claimed) of the present invention implemented by means of the "Wallet Node" system of the invention and taking advantage of its guaranteed execution integrity property (see below "Wallet Node", which describes the embodiment of the system and method for transferring messages between entities and which describes the execution able to guarantee the integrity of the code which is executed), such a certificate can be obtained, in a secure manner, according to a method of "transaction of cross confirmations of attributes", atomic transaction in which participants in the transaction can confirm key/attribute associations to each other, each participant being able to selectively (and optionally) confirm attributes of different types.

This method of transaction of cross-confirmations of attributes and generation of meta-attributes is described below on an example of three users—A, B and C—participating in the transaction. Following the exchange of their respective keys as already described above (typically in a "Key Exchange Party"), the method comprises the following steps:

1. Definition of the participants: the users (A, B and C) each start the transaction (each on their terminal) by declaring the desired set of their respective public keys (these keys representing all participants in the transaction, Occurrence A, B and C), and this triggers the mutual sending of these keys between the participants who can validate them—this first step itself forming an atomic sub-transaction that ends (commit) when a set of users agree on the question of knowing who are the participants to the transaction;
2. Automatic sending of automatically generated meta-attributes certificates, meaning:
for A: 'attribute "my-key: AAA" confirmed by B in the presence of C' and 'attribute "my-key: AAA" confirmed by C in the presence of B', AAA being the key to A,
for B et C: same as for A but with the appropriate permutations;
3. Attribute confirmations: in parallel with the first two steps above (and after), users generate attribute confirmations of each other;

4. Generating Meta Attribute Certificates: After the first step, the following meta-attribute certificates are generated for the additions of attribute confirmations made in step 3, by inserting the addresses of users "in the presence" automatically, as following:

for attributes of A which would be confirmed by B, these confirmations are generated by B in the form "attribute XXX confirmed by B in the presence of C", signed by B, transmitted to C for signature (automatic signature, since it is only a matter of confirming the confirmation of the attribute, not by C itself, but by B in its presence) and the certificate or the certificates thus generated are returned to A to serve as meta-attributes associated with its key;

for attributes of A which would be confirmed by C, as above but by inverting B and C;

and so on for attributes of B confirmed by A or C, and C by A or B, with the appropriate permutations.

5. Transaction commit when all participants have declared the end (or after a certain delay has elapsed since the last confirmation was generated in step 3 or, if not, from step 2) and that all the certificates produced have been communicated to each other.

It is understood that such attributes recognized in the presence of other users (i.e. attributes having associated meta-attributes) are supposed to be more reliable insofar as the entities they refer to are part of the user's entourage. (This will be described later in the reliability rating calculation method.)

It should be noted that the method described above already produces certificates in step 2, even if no attribute (except the key, which can be seen as the first attribute associated with the key itself) has been confirmed.

In a preferred embodiment, users can also be recognized indirectly (transitively) according to rules set in common: when two users B and C which have been recognized by a user A (with "my-key: BBB" confirmed by A' and "my-key: CCC" confirmed by A'), in turn recognize a user D (with a "my-key: DDD" confirmed by B in the presence of C' and "my-key: DDD" confirmed by C in the presence of B'), D is also considered recognized (more precisely "implicitly recognized") by A. The entities such as B, C and D thus form the set of entities that the user A "knows" (later called the set "S"). Advantageously, in this embodiment, the recognition of D by B and C can be notified to A which can then itself recognize it.

This simple method, referred to herein as a "strong reciprocal identification procedure", makes it possible to form a secure network of entities identified in P2P, that is to say without the need for a trusted third party such as a certification authority. (It should be noted that the system of the invention can be implemented on an existing social network, by exploiting the preexisting connections.)

However, as regards the risk of denial of signatures, the strong reciprocal identification procedure does not prevent, for example, associating same attributes with two distinct keys, associations which are confirmed by other entities in the network, and then to deny signed commitments with one of the keys without risking to invalidate the commitments signed with the other key (a user can hold two keys while being able to afford to lose one).

An aspect of the invention is to discourage a user to use different keys, by assigning each attribute association to a key a reliability rating such that a multiplication of the keys for a same user leads to a decrease of reliability rating.

Attribute Reliability Rating

In the framework of decentralization that the invention aims at, these ratings are not absolute: they relate to the third entity that calculates them. They are calculated according to the attribute recognition (see certificate above) carried out in the environment of the third party entity (the user's neighborhood in the network, typically—but not exclusively—its connections of degree 1 or more).

In the neighborhood of a user, the more entities (these are in fact the individuals that these entities represent) that recognize attributes characterizing a given entity, the more this user can rely on that entity—that is, the more the user has reasons to believe that the key of that particular entity is legitimately associated with the distinct individual (or device) it represents. Moreover, in this collective validation approach, entities that generally recognize attributes with higher reliability ratings and are not associated with denied commitments are given a higher weight (called authority rating) as to their ability to validate key/attribute associations.

Thus, the method here comprises counts of attribute/key associations recognitions by the entities of the user's neighborhood, but avoiding taking into account entities that could be specifically introduced (sybil attack) to artificially increase ratings (of entities that would be used to deny signatures).

In this approach, the recognitions in question are of two types:

1 Confirmation: an entity recognizes an attribute associated with the key of another entity (that is, confirms the association between a given attribute and a given key);

2 Commitment: An entity known as a commitment provider issues a commitment to an entity known as commitment beneficiary, each recognizing certain attributes of the other by specifying them as a prerequisite, that is, as a condition of the commitment.

Commitments

In an "commitment acquisition" phase (preceding the "execution" of the commitment), the interactions between the commitment provider and beneficiary entities may include the following steps:

the commitment beneficiary entity recognizes the attributes of the entity providing the commitment (as part of its acquisition of this commitment, as will be discussed below) in order to oblige it to fulfill its commitment and The commitment provider entity can in turn recognize attributes of the commitment beneficiary entity so that only entities with these attributes can benefit from it.

It will be noted here that, in order to address the situations of denial of commitment and their consequences as will be described later, certain information relating to a given commitment existing between a given provider entity and a given beneficiary entity is automatically propagated to entities benefiting from "downstream" commitments (of which the given beneficiary entity acts this time as a commitment provider). This information includes, in particular, an identification of the particular provider entity and the attribute or attributes on the basis of which the particular beneficiary entity has been recognized.

The identification of an entity can be its (public) key, an "address" that can be formed from (the hash of) its key or can be obtained by yet another method. In the following, the terms 'identification' and 'address' are used interchangeably and with the same meaning.

The method of the invention for determining attribute 'reliability' ratings and entity 'authority' ratings (mentioned above) will be described later.

Device Entity and Responsible Entity

In the context of the present invention, for an entity having a key to which attributes are associated, the entity represents either an individual who is the user of the entity and has attributes such as a name or a telephone number, or a device—having attributes such as a trademark, a model and a serial number—these attributes being characteristics of the individual or device in question. (Note that said devices may be in hardware or software.)

In order for entities representing devices ("device entity") to be under the responsibility of individuals, each entity is associated with an entity (and only one) representing an individual (human) who is responsible for it, called the "responsible human entity", so as to link the responsibilities of entities implemented with the invention and the responsibilities in their legal consequences at the level of society and avoid the drifts of such systems.

Each entity (representing an individual or a device) is embodied by a mechanism (hardware and/or software device) called "Wallet Node", described below, having exclusive control of its key, capable of performing computer processes and of generating their proofs, and is also able to generate detection of absence of treatment expected from others, which the entity in question is supposed to benefit. Advantageously, Wallet Nodes can store certificates, such as meta-attributes, and a Wallet Node can be created in the system in representation of a key generated by an "external entity" such as a governmental authority for example.

At the initialization of an "individual" entity, an "individual" property is assigned to it. Note that only individual entities can recognize attributes of other entities (since they are actually the individuals that these entities represent that recognize these attributes). Similarly, only individual entities may have authority ratings.

At the initialization of a "device" entity, a "device" property is assigned to it and the address of an "individual" entity that is responsible for it ("responsible human entity") is also assigned to it upon receipt of the signature of the "individual" entity in question.

In addition to the "responsible human entity", each entity may be assigned another entity as a "responsible entity" (upon receipt of its signature), which can be of the "individual" type or not. The responsible entities can thus form a transitive chain of responsibility and in the other direction, the same entity may be responsible for several other entities, with a specific management of the chain whereby a downstream entity can not be responsible for an upstream entity which is directly or indirectly responsible for it, the relationships of responsibility thus forming a tree structure.

A responsibility relationship is implemented in the form of a specific type of commitment, by which the commitment provider (i.e. the responsible entity) brings an "exposure weight" (described below) in the commitments of the commitment beneficiary, and this transitively by following the responsibility relationship of the entity providing the commitment.

Thus, in order to address the situations of denial of commitment and their consequences as mentioned above, said automatic propagation to commitment beneficiary entities downstream (propagation of the addresses of the commitment provider entities and of the attributes on the basis of which the beneficiary entities have been recognized) are also carried out via the transitive responsibility chains.

Denial of Commitment

An example of a commitment is an access authorization, the access being for example the unlocking of a room door using NFC technology performed by a lock ("device" entity, commitment provider) when establishing a near field communication with the smartphone ("individual" entity, commitment beneficiary) of the person who rented the room. Such communication may include the sending of information signed by the commitment beneficiary entity to the commitment providing entity in order to fulfill the commitment (door opening command, hereinafter referred to as the "execution request") and, in the other direction, the submission of information signed by the commitment providing entity to the commitment beneficiary entity (called "proof of performance"), proving that the commitment was fulfilled (for example triggered by the reading of a secured contactor whose opening reliably indicates the effective opening of the door). This signed information, to avoid fraud, may contain the result of the application of a determined function to a single challenge (nonce) sent by the beneficiary at the time of the execution request.

In this specific example, the entity providing the commitment ("lock entity") has a responsible entity ("door entity", beneficiary for example of commitments for water and electricity for this room by other entities) and these two entities have the same "responsible human entity" (representing the owner of the room). At the time of purchase of the commitment (the rental of the room in question), information including the addresses of the persons in charge of the 'room entity' and the 'responsible human entity' are communicated to the entity receiving the commitment (advantageously without being disclosed to the users, as described below), this in the context of the automatic propagation to downstream beneficiary entities described above to deal with situations of denial of commitments and their consequences.

Assuming that an amount of units of account is associated with each commitment (this amount representing the value of the execution (or of the total execution) corresponding to the commitment in question, here it is the price paid for the rental), in the event of failure to deliver (i.e. proof of performance not sent in time in response to execution request—here the proof of the unlocking of the lock is not sent in time in response to an opening command), a certain time limit is granted in the commitment to the entity providing the commitment (here it was granted in order to let the renting provider to solve any technical malfunction which would prevent the opening) and when it has passed, if the proof of performance in question or of compensation as provided for in the contract for the commitment is not sent by the providing entity (which in the present case may be, for example, evidence of a reimbursement transaction or proof of the provision of another room while waiting), the latter as well as the chain of its responsible entities, where appropriate, go to the state "denial of commitment" for the commitment beneficiary entity. Consequently, the associations between the key and the attributes recognized in the commitment are invalidated with respect to the "incoming" commitments contracted by other entities to the same entity this time as the beneficiary of commitments. Following the notification of the latter (see the description below), by way of sanction, the incoming commitments specifying these attributes (if there is no inconsistency of attributes, see the definition of "compatible attributes" below) are frozen during a so-called "arbitration" phase also provided for in the commitment. This penalty of freezing the incoming commitments is also applied to the entities in the responsible entities chain upstream, up to the amount of the commitment in question (see the example below).

By "in the commitment a time-limit is provided for the receipt of the execution proof by the beneficiary entity", it is meant that the contract of that commitment (executable contract, or smart contract, as will be described below), which is a computer program running within that beneficiary entity, is awaiting receipt of the execution proof within that time-limit.

Specifically, the timeframes that a commitment provides for include preferably:
1. a first (short) deadline for receiving the execution of the commitment (in this case opening the door);
2. a second deadline to correct the default or to compensate the beneficiary spontaneously as agreed in the commitment (which may include several options, typically a commitment by the responsible human entity guaranteed by a trusted third party) and
3. a third period (arbitration time), typically for a judicial or arbitration decision by a signatory provided for in the commitment (the "arbitrator"), decision whether or not to associate the commitment default to an identified individual deemed to be represented by the responsible human entity and to decide the consequence of that association, if any.

Note that for each message sending (such as a request or proof of execution, a nonce or the hash of a nonce in return, a compensation transaction, a debt recognition, or a decision sent by an arbitrator), the message is signed and the system of the invention (see Wallet Node) provides for an acknowledgment of receipt within a certain period, failing which (or in all cases) the message in question is recorded in an immutable data structure (such as a blockchain shared by the parties or by trusted third parties) deemed to be consulted (by contract), which makes it possible to prove the sending or to verify the non-sending (and thus to generate the proof of the absence of an expected message). It should be noted that advantageously the use of such an immutable data structure can be restricted to (exceptional) cases of non-reception of acknowledgment of receipt, and still more advantageously, thanks to the implementation of the Wallet Nodes, as already mentioned, instead of a blockchain, it is possible to use a simple register (which can be distributed or not, storing the Wallet Messages).

Thus, the steps of executing a commitment are (potentially) the following:
1. A request for execution (access request) is sent by the beneficiary entity to the provider entity. The latter has a 'first deadline' to execute the commitment (give access). This step may typically include additional substeps, such as generating and sending by the provider entity of a first nonce to the beneficiary entity, who must generate a new nonce and return it to him with the hash of the first nonce, these two nonces in combination being then used in the generation of the execution proof by a secure device at the level of the entity providing the commitment.
2. Case of non-execution: on the basis of a detection of non-delivery of proof of execution, the beneficiary entity generates and sends to the providing entity proof of non-fulfillment.
3. Case of denial of commitment: after the expiry of a period laid down in the commitment (second deadline), if the proof of execution (for compensation) as provided for in the commitment is not sent to him, the commitment benefiary entity generates the statement of denial of commitment (i.e. the finding of the absence of proof of execution/compensation);
initiates the arbitration procedure defined in the contract of the commitment (typically the arbitration procedure, initiated by the executable contract of the commitment, includes the notification of an "arbitrator" entity accepted by the parties and waiting for receipt of the decision to close the procedure and proceed to the next step—step 4 below);
determines the incoming commitments to be frozen—these are, where applicable, the commitments for which the provider entity is a beneficiary and whose recognized attributes are compatible with the attributes recognized for that entity in the defaulting commitment;
"Compatible" means "intersecting and not inconsistent". The attributes include "strong attributes" uniquely designating entities and/or "weak attributes" designating potentially non-unique entities, and the detection of inconsistency comprises the detection of a strong attribute which is contradictory with the attributes recognized in the defaulting commitment or a set of different attributes for given attribute types.
sends to the entities supplying the said inward commitments to be frozen, the statement of denial of commitment and the notification to freeze these commitments;
this step is renewed, up to the amount of the commitment in question, going back to the responsible entity and then, where applicable, from one responsible entity to the other (always to the extent that the attributes recognized in the following commitment are consistent with the attributes of the current commitment being processed);
advantageously, the method may provide for notifying the beneficiary entities (of the defective entity) of the change in state of the latter.
4. Upon receipt by an "arbitrator" provided for in the commitment, of a positive decision (meaning in substance that the consequences of the failure to fulfill have been carried over to a human and that blocking incoming commitments must be removed), the said freezing are discontinued and, on the contrary, if a negative decision is received, the commitments in question are definitively invalidated.

It should be noted that the denial of commitment referred to in point 3 is in fact only a presumption of a denial of commitment which is confirmed or set aside in point 4.

Thus, for example, with reference to FIG. 1A, an entity $E_j$ has a commitment $EN_{jl}$ as a provider to an entity E1 as a beneficiary, for an amount $M_z$, this commitment being an access commitment. The detail at the level of the entity $E_j$ (to the right in the figure) shows that, with respect to the $EN_{jl}$ commitment, $E_l$ recognizes the attributes $A_{j1}$, $A_{j2}$ of $E_j$ and that for the incoming commitments, namely:
$EN_{ij}$ (of an amount $M_x$) of $E_i$ and
$EN_{kj}$ (of an amount $M_y$) of $E_k$,
the recognized attributes of $E_j$ are respectively $A_{j3}$, $A_{j4}$ and $A_{j2}$, $A_{j3}$, $A_{j4}$.

The detail at the level of the entity $E_j$ also shows that $A_{j2}$ is a strong attribute (in bold in the figure).

If access in the context of an access transaction according to the commitment $EN_{jl}$, of which $E_l$ is actor, does not succeed (first elapsed time), the entity $E_l$ automatically generates the proof of it, notifies it to $E_j$ and, initially, a certain time limit (second deadline, also provided for in the contract of the commitment) is granted, for example to solve technical problems leading to the impossibility of access.

Figure 1B:
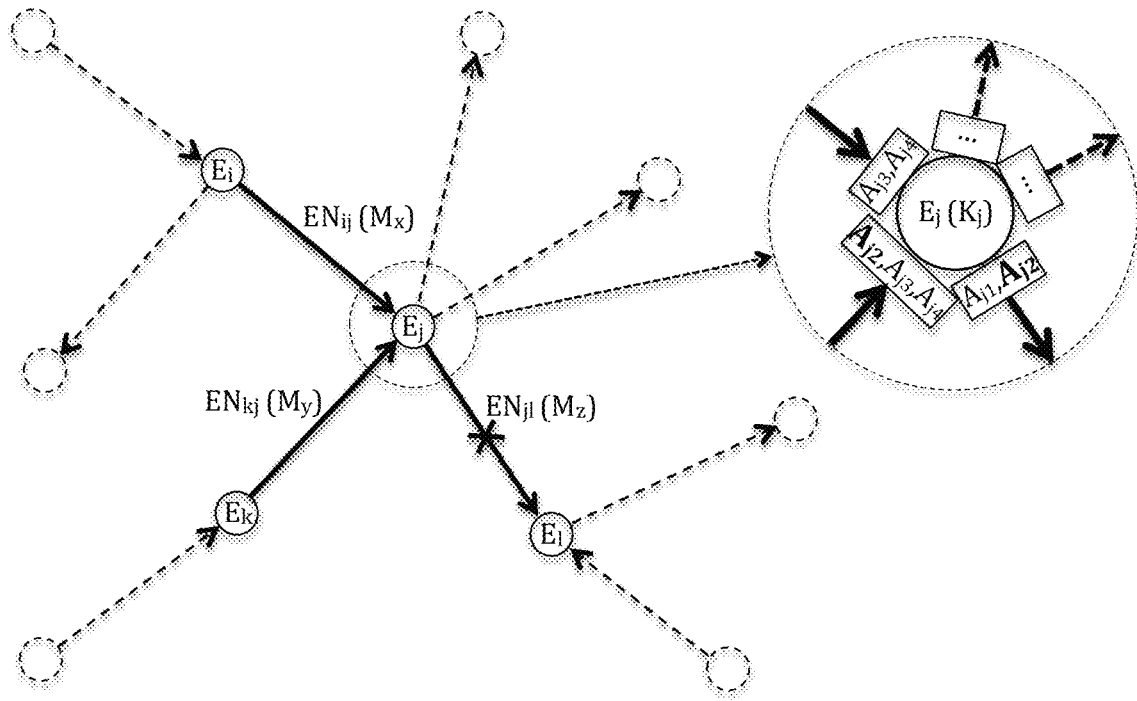

After the expiry of this period, if the lack of fulfillment $EN_{jl}$ is not corrected (in the event of non-compensation in accordance with one of the options, if any, provided for in the commitment agreement), the denial of the commitment $EN_{jl}$ is detected by the entity $E_l$, and consequently the association between the attributes $A_{j1}$, $A_{j2}$ and the key $K_j$ of the entity $E_j$ (FIG. 1B) is provisionally invalidated vis-à-vis inward commitments $EN_{ij}$ et $EN_{kj}$.

Figure 1C:
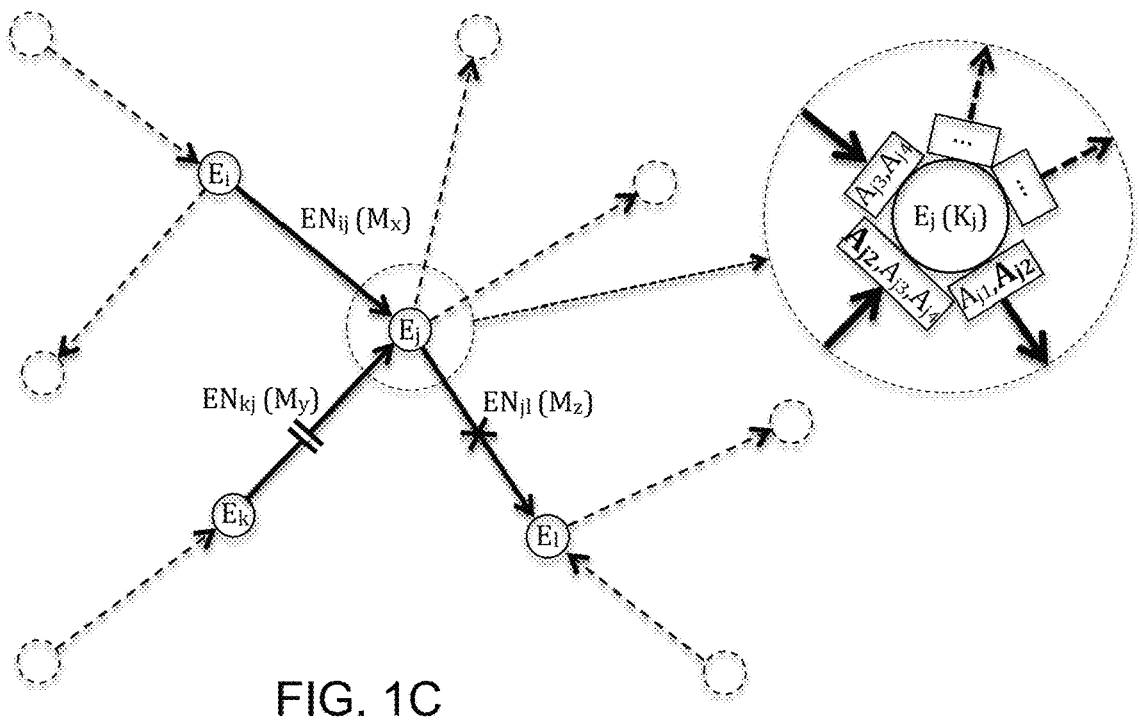

$E_l$ then notifies the arbitrator provided for in the contract of the commitment, of the denial of the commitment $EN_{jl}$ and compares the attributes of $E_j$ recognized in the inward commitments with those recognized in the defaulting commitment $EN_{jl}$. It follows that only $EN_{kj}$ has an intersection of attributes and this intersection includes only the attribute $A_{j2}$. As a strong attribute, $E_l$ notifies $E_k$ to freeze its commitment $EN_{kj}$ of which the entity $E_j$ is beneficiary (see FIG. 1C).

Figure 1D:
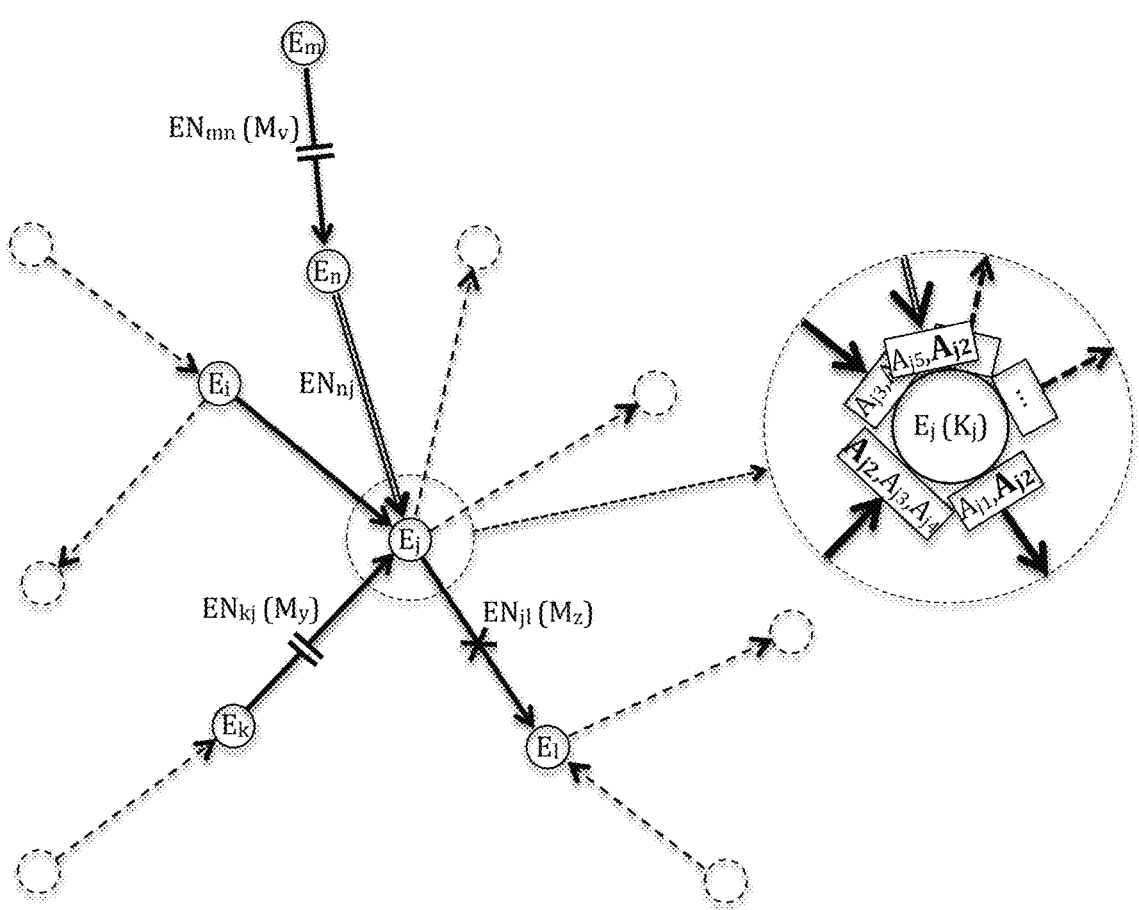

This step is propagated to the entities responsible of $E_j$ upstream (by the substeps below) until the total of the amounts of all frozen commitments reaches (or exceeds) $M_z$:
1. The total amounts of all commitments already frozen are compared with $M_z$. As $M_y$ is less than $M_z$, the process goes up to the responsible ($E_j$ can represent the lock, $E_l$ the tenant, $E_n$ the landlord $E_m$ The electricity supplier for example).
2. $E_l$ had been notified of the responsible $E_n$ of $E_j$. The latter recognizes (on the commitment of responsibility $EN_{nj}$) enough recognized attributes on the defaulting commitment $EN_{jl}$ (In this case, it is $A_{j2}$, which is sufficient in itself since it is a strong attribute) and whose other recognized attributes (in this case $A_{j5}$) do not show any inconsistency with the latter.
3. $E_n$ is beneficiary of a commitment $EN_{mn}$ (of $E_m$, for an amount $M_v$) recognizing a sufficient portion of its attributes that are recognized by $E_j$ on $EN_{nj}$, and without inconsistency.
4. Consequently, $EN_{mn}$ is also frozen (FIG. 1D) and since $M_y+M_v$ is reached (or is greater than) $M_z$, this step ends.

Subsequently, upon notification of a positive decision by the arbitrator, such freezings are canceled or, if the decision is negative, these commitments are definitively invalidated.

It should be noted that the receipt by a given entity of a notification of denial of commitment in relation to given attributes entails the notification by that particular entity of the information of that denial to the entities providing commitments (on compatible attributes) to the entity accused of the denial, whose authority ratings are then reduced in response to receipt of that notification.

Advantageously, the method of the invention establishes an commitment weight called "Exposure Weight" for each entity according to the amounts of the commitments for which this entity and its responsible entities (compatible with its attributes, as described above) are beneficiaries of commitments. Thus, in the example, the Exposure Weight presented by $E_j$ vis-à-vis $E_l$ is equal to $M_y+M_v$.

Determination of Ratings

The method of calculating the ratings described below takes into account the Exposure Weights described above and exploits the fact that at the level of each given entity, if any, are recorded:

the addresses of the entities which have with that given entity a commitment (a current recognition link of an attribute at a given time) as a commitment provider or beneficiary (or as a commitment transfer recipient, see below), as well as the addresses of the entities having simply confirmed the attributes of this given entity (whose attributes are recognized by this given entity).

The process starts with the entity representing the user herself as well as a set of entities that the user "knows" (for example by the strong reciprocal identification procedure described above) and confirmed attributes. This set is called "S" here.

As already said, in the neighborhood of a user (determined from S), the more entities that recognize attributes associated with a given entity, the more this user can rely on that entity. In addition, entities that generally recognize attributes with higher reliability ratings (and not associated with denied commitments) are given a higher weight (called authority rating) in their ability to validate key/attributes associations.

From S, we will construct the set "S—" of the entities which, as commitment provider, have a commitment having attributes compatible with (at least) one entity of S. Thus the sign "—" indicates that a set of "upstream" entities is being constructed.

Compatible means compatible with the attributes recognized in the previous step, the term "compatible" having the meaning given above. For example, if for a given entity of S certain attributes have been recognized by (the entity representing) the user, an entity of S— is an entity, a provider of commitment to that particular entity, having recognized compatible attributes with those recognized by the user.

Then, from the constructed set S—, is constructed the set "S—+" of the entities towards which at least one entity of S—, as commitment provider, has a commitment having compatible attributes. Thus the sign "+" indicates that, starting from S—, a set of "downstream" entities is built.

In addition, S_+ is the set of entities that, as a commitment provider, have a commitment with attributes that are compatible with (at least) an entity of S+. The sign — was reused to construct a set of downstream entities including S—.

And so on, we can build bigger and bigger sets, like Russian dolls.

Thus, starting from S, the sets constituting the neighborhood of the user are created as defined below:

S— (or S S—+, S+—, S—+—, S—++, S+—+, S—++—, , etc.): It is the set of entities that, as a commitment provider, have a commitment with attributes compatible with (at least) one entity of S (resp. S S—+, S+—, S—++, S—++, S+—+, etc.—(see below) and so on, depending on the extent of the desired neighborhood);

S—+ (or S—++, S+—+, S—++—, S—++—, S+—++, etc.): entities to which at least one entity S— (resp. S—+, S+—, S—++, S—++, S+—+, etc.—see below) has, as a commitment provider, a commitment with compatible attributes;

( S—+— is the set of entities that, as a commitment provider, have a commitment with attributes that are compatible with (at least) one entity of S—+)

S+ (or S S+—+, S—++, S+—++, S+—++, S—+++, etc.): Entities to which at least one entity of S (resp. S+—, S—+, S+—+, S+—++, S—++ —see below—and so on according to the extent of the desired neighborhood) has a commitment with compatible attributes;

S+— (or S+—+, S—++, S+ + , S+ ++ , S—++—+, etc.): entities that have a commitment with attributes that are compatible with (at least) an entity of + (resp. S+—+, S—++, S+ + +, S+—++, S—++—+, etc.)

Note that S—+ includes S—, that S+—+ includes S+, that S+ + includes S+, and so on.

Reliability ratings are calculated (as described below) for the attributes of the entities of S—+ (or S S_ +—+, etc.) as well as for the attributes of the S+ (or S+ + , , etc.).

"Authority ratings" are calculated (as described below) for the entities of S— (or S—+— etc.) as well as for the entities of S+— (or S+—+, etc.).

It should be noted that the same entity may belong to several of these sets, for example S— and S—+, and thus have both the authority and reliability ratings.

The method of calculating the ratings is iterative and at each iteration, the ratings are normalized. Beforehand, the size of the extent of the neighborhood is fixed and the sets in question are determined. Then, the steps are as follows:

1. Initialisation

Reliability ratings of the attributes of the elements of S are initialized to 1, then normalized (divided by their total at each element, so that their new total is equal to 1, then re-divided by their total at the level of the set S, so that the new total for S is equal to 1). The attributes of the other entities of S—+ (ou S—+—+, etc. depending on the extent of the neighborhood that was chosen) initially have a zero reliability rating—as stated below, their respective reliability ratings will be calculated on the basis of the elements of S— (ou S—+, etc.) iteratively.

2. Calculation of Authority Ratings

For each given element of S— (or S—+—, etc.), the authority rating is (re)calculated by summing the reliability ratings of the attributes recognized by the commitments (for the elements of S—+, resp. S—+—+, etc.) which this given item is a commitment provider. Authority ratings are normalized (divided by their total so that their total is equal to 1).

Advantageously, this authority rating is weighted by the value of the commitment in question and by the weight of the commitments towards itself (Exposure Weight). It is also normalized.

3. Calculation of Reliability Ratings

For each given attribute of each entity of S—+ (or S—+—+, , etc.), the reliability rating is (re)calculated by taking the ratio between:

The sum of the authority ratings of the entities of S— (resp.

S+—+—, etc.) which provide a commitment recognizing that given attribute while being an commitment provider for at least one element of S and The sum of the authority ratings of the entities of S— (resp.

S+—+—, etc.) who are providing a commitment recognizing that given attribute or are providing commitment for at least one element of S.

Advantageously, the meta-attributes of said attributes of S—+ (or S+—+—+, etc.) are likely to increase their reliability ratings according to the authority ratings of the entities that appear in these meta-attributes. More precisely, if a meta-attribute of an attribute XXX recognized in a given entering current commitment meaning "this key belongs to the one that has the attribute XXX recognized by YYY in the presence of ZZZ . . . " refers to:

a YYY entity belonging to the set of entities considered S—
  (resp. S—+—, etc.) but does not provide a commitment to the current entity of S—+ (or S+—+—+, etc.),
  then it is as if, in this set, there was an incoming commitment that recognized XXX and therefore in the counts one adds its authority rating;
an entity (as "in the presence of") ZZZ,
  then the authority rating of the entity YYY taken into account has more weight (for example +10%).

The result for each given attribute is normalized (divided by the total reliability ratings at each element level, so that their new total is equal to 1 at each item level, then re-divided by their total at the level of the set S, so that the new total for S is equal to 1).

4. Iteration

Steps 2 and 3 are iterated as long as the ratings have not converged (in other words, the iterations stop when the new reliability ratings obtained are sufficiently close to the previous ones with a given deviation. In general less than 10 iterations are sufficient).

Optimizations can be made, notably taking into account the minimum and maximum of the authority scores.

The same principles can advantageously be transposed to S+ (S+—+, S—++, S+—+—+, S+ ++, S ++ +, etc.). This then gives the following steps:

5. Calculation of Reliability Ratings

For each given attribute of each entity of S+ (or S+—+, etc.), the reliability rating is (re)calculated by taking the ratio between:

the sum of the authority ratings of the entities of S (resp. S+—, etc.) which provide a commitment recognizing that given attribute while being a commitment provider for at least one element of S and the sum of the authority ratings of the entities of S (resp. S—+ etc.) who are providing a commitment recognizing that given attribute or are providing a commitment for at least one element of S.

Here again, advantageously, the meta-attributes of the attributes of S+ (or S+ + etc.) are likely to increase their reliability ratings based on the authority ratings of the entities that appear in these meta-attributes, as described previously (remplace S— (resp. S—+— etc.) with S (resp. S+—etc.)).

The result for each given attribute is normalized (divided by the total reliability ratings at each element level, so that their new total is equal to 1 at each item level and then re-divided by their total at the level of the set S, so that the new total for S is equal to 1).

6. Calculation of Authority Ratings

For each given element of S (or S+—, etc.), The authority rating is (re)calculated by summing the reliability ratings of the attributes recognized by the commitments (for the elements of S+, resp S+—+ , etc.) which this particular item is a commitment provider. Authority ratings are normalized (divided by their total so that their total is equal to 1). Advantageously, the authority rating is weighted by the value of the commitment in question and by the weight of the commitments towards itself (Exposure Weight). It is also normalized.

7. Iteration

Steps 5 and 6 are iterated as long as the ratings have not converged. (Generally less than 10 iterations are sufficient).

Both directions (towards S— vs. towards S+) can be alternated so that the direction towards S— takes advantage of sets such as S S+—, S—++, etc. and that the direction towards S+ takes advantage of sets such as S—++, S+—++, etc.

Advantageously, rather than (or in addition to) taking into account only commitments, the method of determining reliability and authority scores can take into account for S— (or S + , S+ , etc.) entities whose attributes are recognized by at least one entity of S (resp. S—+, S+, etc.) and reciprocally (requiring bidirectional recognitions, to avoid unwanted entities/sybil attack), and In the other direction, for S—+, S—+—+, S+, etc., entities whose attributes are recognized (resp. by an entity of S—, S—+—, S, etc.) but without requiring bidirectional recognition.

In addition to taking account of meta-attributes as described above (to increase the reliability ratings as a function of the authority ratings of the entities included in these meta-attributes), advantageously a "consistency coefficient" of the attributes is applied to increase the reliability ratings of so-called "consistent" attributes. This coefficient depends on the ratio between:

the number of incoming commitments that recognize the attribute in question and also recognize other attributes of the entity in question (weighted by the number of these) and the total number of incoming commitments that recognize attributes of the entity in question.

Certification of Products in Supply Chain

An entity can generate product identifiers in the form of a "tag" (defined below), which can be used in decentralized Supply Chain Management applications. The same method can also be used to generate identifiers of documents (file or group of files, programs, etc.) or as proof of first creation of a trademark, a domain name, etc.

Tag: Unique identification file containing one or more "certificate of origin" of a physical product or a non-physical resource (to a tag is only one physical product or non-material resource)—whereby an existing certificate of provenance can not be modified or deleted, but other certificates of provenance can be added to the tag.

Certificate of provenance of a product or (digital) document: signature, by an entity capable of certifying the product or the document, of a set of attributes characterizing it; for example, a certificate of provenance can certify an origin, a certain transformation in a chain of transformations, etc.

Uses of a Tag:

The tag is in a label associated with a material product, allowing it to identify and detect illicit reproductions (considered as imitation, counterfeit, etc.). Typically, a label (physical tag) is attached to the product and is provided with machine-readable code such as QR-Code, RFID, etc. derived from tag content.

The tag is a metadata associated with a created non-material resource such as a document, file, group of files, etc., to identify it, to detect illicit reproductions or uses, etc. Typically, the tag can be a "manifest file" (known in the software domain).

The tag is associated with a non-physical resource such as a cadastral certificate, a trademark or a domain name, includes a timestamp giving it priority, and is included in a publicly accessible register, preferably implemented in a distributed hash table (DHT).

In the following, "product instance" means an instance of a physical product or a non-material resource.

According to the method of the invention, the (digital) tag of a product instance is generated (preferably when it is created) by an entity called its "Owner Wallet Node" (OWN) whose address is included in the content of the tag, and can then be transferred from one OWN to another. When it is transferred, the transferor does not have it anymore, which implies that at any moment a tag has only one Wallet Node of type OWN: This deletion of the tag from the transferor is carried out reliably because of the guarantee of the integrity of execution of a "Wallet Program" by a "Wallet Node" entity (see description of the Wallet Nodes and Wallet Programs in the following), with a possible implementation in a P2P architecture and without requiring the use of a unique and shared security chain of the "Blockchain" type.

Initially, the OWN that generated the tag controls it automatically (it is a property associated with an entity). Then another entity can ask to control it. This transfer of control takes place on a "first applicant—first served" basis. The entity that controls a given tag at a given time is referred to as the "Viewer Wallet Node" (VWN) of that tag (initially, the OWN is at the same time its VWN entity). Then another entity can make a request to take control in turn and become the new VWN of this given tag, and so on, so that there is always only one VWN that controls a given tag. The execution integrity of the entities ensures that, with the exception of the initial OWN that generated the tag, each entity that controls a tag received it from an entity (the previous VWN) that no longer controls it. Thus, the tag seen by an entity can not be a duplicate of a tag seen previously: it is rather the same tag that typically moved in its transport and/or transformation chain, from a VWN to another.

In order to be able to find the current VWN of a given tag, the address of the current VWN of the tag is stored and maintained by the current OWN of the tag whose own address can be retrieved by navigation from the OWN which generated the tag (and whose own address is included in the tag's content). The execution integrity of the OWN entities ensures that the current VWN of a given tag can be retrieved.

The validity of a product instance associated with a given tag is obtained by making a query to the current VWN of that tag, which responds with a message whose plaintext can be "that given tag is under my control; it was generated by the entity XXX; I have myself received control of it from the YYY entity and since then no entity has yet asked me for it", thus indicating that it has this tag under its exclusive control until a request from a subsequent VWN is accepted, and as already said, the system guarantees that no other entity (running the same VWN "Wallet Program") will, while it has this tag under its control, validate a product instance for the same tag.

It follows that, to the extent that a tag uniquely identifies a product instance, all product instances—to which one tag is associated—validated one at a time in time by a VWN entity are identified as a single product instance (typically in a transformation chain, supply chain, etc.).

In other words, by using this method to validate the product instances, to a given identifier (in the form of a tag) is supposed to correspond in the real world only one instance of product ("official", "authentic", "certified") although it can evolve from one control or validation to another.

This process finds applications especially in Supply Chain Management, where a product must be audited in various relays of its supply chain using certifier equipment including a VWN, its tag including new certificates resulting from these audits, its traceability being guaranteed, this product can be composite and result from assemblies or compositions of several such instances of product—or to verify that a single instance of a software is being used at a given time or that a document is valid—without any central device being used: following the creation of the instance in question, the entities performing such audits or verifications do not necessarily share a common structure or require the use of a single, shared security chain of the type "Blockchain".

In the case where a transformation step in the chain brings about, at the level of a certifying equipment, to modify the characteristics of a product or the fact that one set of products is transformed into another set of products, this certifying equipment may be entitled to substitute the corresponding physical tags (according to the rules laid down in the executed Wallet Program).

In a particular implementation of the invention for certain product types, each product instance contains or comprises its own OWN physical entity (implemented as a Wallet Node according to the system of the invention) and the transfer of OWN becomes unnecessary when transferring ownership.

In the event that, at the end of the logistic chain, a product instance associated with a given tag is illicitly replaced by another (for example of lower value or quality), the instance in question may be audited to verify the illegal replacement of the certified attributes in the tag (such as a photo), and the entity that provided it may be automatically defaulted as described in the "Commitments" section.

The third use mentioned above (requests to a register storing tags or time-stamped certificates) indicates that the secured data of the tags, in particular their respective priorities, can be retrieved from a register where they are stored. Advantageously, with the guarantee of the integrity of execution of the Wallet Programs as described below, such priorities obtained by time stamping are guaranteed to be genuine (the signatures of the time stamps being performed by OWN entities which are Wallet Nodes able to synchronize their respective clocks In a secure manner): the method does not require the use of a single, shared security chain of the "Blockchain" type to guarantee them. It should be noted that the said register can be implemented in a centralized, partially decentralized or distributed manner (in a DHT, "Distributed Hash Table").

Other uses include:
the authorization to reproduce a tag a limited number of times: a current VWN having control of a given tag agrees to pass its control, not to only one, but to several subsequent VWNs, as long as the total number of tags circulating does not exceed a given threshold,
link to tags automatically generated properties such as geolocation, the VWN in question validating the tag according to rules associated with it.

Methods will now be described for ensuring that a physical tag (typically an RFID electronic circuit) storing the data of a digital tag described above and affixed to a physical product has not been unintentionally or fraudulently moved to another product (e.g. a product of lower or lower quality).

According to a first embodiment, a VWN having the role of affixing such a physical tag and having a certification capability may be part of an equipment capable of automating taking a photograph of a region of the product comprising the physical tag and to encode this photograph (hash-code, algorithm for generating a single character string associated with the photo, thumbnail of the photo or photo such as) in the tag itself.

Afterwards, to verify that the physical tag has not been moved to another product, taking a picture, for example by the purchaser of the product in question, can be carried out, this photo being then subject to the same encoding, and this encoding being compared with the content of the tag, to certify (or simply verify) that the tag is located on its original product. Advantageously, the equipment used to take this picture is provided with positioning means enabling it to take the photograph in the same position as that at which the photograph which gave rise to the encoding in question was taken (with a deviation depending on the implementation in question).

This approach is particularly well suited to products with sufficiently variable aspects for each photo encoding to be unique (e.g. food products).

According to a second mode, the equipment performs a molecular scan of the product, for example with a near infrared spectroscopy technology (of the molecular scanner type manufactured by Consumer Physics, Inc., Israel), and writes in the tag information representative of the molecular composition of the product.

Subsequently, in order to verify that the physical tag has not been moved to another product, a new molecular scan is performed, for example by the purchaser of the product in question, and the molecular composition information is compared with the content of the tag, to certify that the tag is on its original product.

Other techniques for associating unique characteristics of a product with its physical tag may also be used.

In the case where a transformation step in the chain brings about the modification of the unique characteristics of a product (typically its visible appearance or its composition in near infrared spectrometry), then this certifying equipment can be configured to modify or complete the corresponding data in the physical tag, or to replace the physical tag.

Care Capacity Commitment and Takeover Commitments

We will define the terms used and describe transfer transactions, of care capacity commitments in the event of occurrence of events of a given type, and commitments to take over commitments between issuing entities.

Issuing entity: An entity that generates a given commitment.

Acquirer: For a commitment made by an entity providing the commitment to an entity beneficiary of the commitment, the "acquirer" is that beneficiary entity. The latter is said to "acquire" the commitment in question. Thus, the first beneficiary of a commitment generated is its first acquirer. For the following acquirers, the commitment being generated in an initial Wallet Message by the entity providing the commitment, a transfer transaction (see below) of this commitment to the next acquirer is implemented in another Wallet Message sent to the latter, including the original Wallet Message in its content. Advantageously, for commitments of a given issuing entity, a conditional commitment "CCC" (see below) may be provided to the acquirer, a triggering event of which is the failure of the exchange of said commitments of a given transmitting entity via the exchange network (see below). Commitment transfers are, where appropriate, "accepted" by means of reverse Wallet Messages returned by the next acquirer. In the remainder of this section, we will look specifically at "bearer commitments": these are commitments in which the first acquirer is the provider entity itself (issuing entity) and can then be transmitted from that acquirer to another and so on. (Unless otherwise stated, the term "commitment" means "bearer commitment" and generally refers to commitments exchangeable against any other commitments of the same supplier that have the same value at the current time).

Value of a commitment: With each commitment is associated, in addition to the address of the issuing entity, its value in units of account (UA), which are common units for all commitments. We consider here that commitments of the same entity (ie generated by the same issuing entity) are potentially exchangeable (in the "trading network", see below) against commitments of another entity having the same Value (that is, to which the same value is associated).

Memorisation of commitments at the level of each entity: In the case of a transfer of a commitment (regardless of which entity transfers), data comprising the address of the issuing entity and the value of the commitment are stored at the acquirer to which the commitment is transferred, which makes it possible to update, at the level of the latter, the "balance" for this issuing entity (see below).

Balance (of a particular entity, for commitments of a specific issuing entity): Total value (in UA) of the commitments of a specific issuing entity to the particular entity. For each entity, for each set of commitments of a different issuing entity, such balance is associated (explicitly or implicitly), and the non-zero balances are stored there (the unrecorded balances implicitly have a zero balance).

Amounts + and Amounts −: With each entity is associated the information of the commitments to be exchanged (via the "exchange network", see below), namely:

'Amounts +': Of which issuing entities this entity declares willingness to transfer commitments, and for what maximum amount given in UA (of course, the Amounts+ must be less than or equal to the corresponding balances);

'Amounts −': Of which issuing entities this entity declares to seek (be prepared to acquire) the commitments, and for what maximum amount given in UA.

Note that each entity has as one of its 'Amounts +' its own commitments as an issuing entity (for an amount which by default is infinite).

Thus, 'Amounts +' and 'Amounts −' are pairs {issuing entity, quantity in UA}.

Exchange network: This network consists of nodes which are the entities to which are associated 'Amounts +' and 'Amounts −', and the edges between nodes represent matchings of opposite sign amounts. At each edge is associated the issuing entity and the quantity of UA (capacity in the sense of the flow networks) of commitments exchangeable by matching of amounts + and − (this is the minimum amount of different signs indicated on both sides for that issuing entity). For a good understanding, it is considered here that between two nodes there are as many edges as there are issuing entities for which there exist 'Amount +' and the 'Amount −' on both sides. The exchange network thus makes it possible, for example, to exchange commitments of different issuing entities between a node (entity) A and a node (entity) B, into an "exchange transaction", considering the exchange network as a flow network, and, to take a purely illustrative example:

by determining the paths for transfer of commitments maximizing the transferred UAs in the direction A to B,
as well as in the opposite direction (B to A), and
by transferring commitments for the minimum in UA between these two ways (A to B and B to A), these transfers resulting in the maximum exchange possible with respect to the 'Amounts +' and 'Amounts −' declared by A and B.

In practice, the flow networks comprise balancing means which are known and the person skilled in the art can draw inspiration from them.

Exgange transaction: Transaction consisting in exchanging on the exchange network commitments of the same value, of different issuing entities, to the extent of the capacities on this network seen as a network of flow.

Commitment(s) transfer transaction: Transaction for transferring at least one commitment issued by a given entity and for a given value (in UA) from one entity to another.

UA transfer Transaction (as opposed to Commitment transfer transaction): Transferring a given value (in UA) to a destination entity amounts to:
acquire through an exchange transaction commitments (or already having enough commitments) of the said destination entity for that given value, then
carry out a transfer of these acquired commitments to the said destination entity.

By way of illustration, a transfer of 100 UA by the entity 'A' to the entity 'B' is for example carried out according to the following steps:

1. in 'A' is added (by a user input) 100 UA of commitments of 'B' in the 'Amounts −' and an exchange transaction is initiated, in order to exchange for 100 UA, if possible (see next paragraph), commitments indicated in 'Amounts +' of 'A' against commitments of 'B' (which at least 'B' has in its 'Amounts +', as already mentioned), on the exchange network, then
2. a 'B' commitment transfer transaction for 100 AU is executed from 'A' to 'B'.

In the case where the exchange network does not allow the acquisition of all of these 100 UAs of the issuing entity 'B', 'B' has the option of generating a 'capacity commitment' (CC, see below) for an amount of UA greater than or equal to the UAs not acquired by the exchange transaction.

In other words, the system is composed of entities forming nodes of a network linked by non-conditional commitments between commitment issuers and acquirers, having values in units of account common to all commitments, each node comprising a memory containing:

balances of commitments, issuer by issuer,
amounts of commitments available for other nodes (Amounts+) or searched from other nodes (Amounts−), issuer by issuer,
units of account corresponding to commitments being transferable between the nodes and the balances and amounts at the different nodes being recalculated accordingly, and
the network of nodes constituting a flow network whose capacities of the edges between nodes are determined according to the commitments available and the commitments sought for a given sending entity, and wherein a transfer of units of account from a first entity to a second entity is implemented by the following steps:

if a commitment balance at the first entity for an issuing entity corresponding to the second entity is sufficient, effecting the transfer of required units of account,
if this balance is insufficient, increase the amount of commitments sought (Amounts−) for that same issuing entity for at least the missing units of account,
performing a load balancing process of the flow network in order to satisfy all or part of that search, and
carry out or complete the transfer of units of account to the extent of the commitments sought which have been met by this balancing.

CCC type (or type of care capacity commitment): "Care capacity commitment" (see below) specifying the same trigger conditions (such as the signature of a predetermined arbitrator). A same CCC type identifier is associated with the "care capacity commitments" of the same CCC type. Each CCC type specifies the procedure for checking the signature (s) if any provided for in said triggering condition.

Transfer trigger event: A "care capacity commitment" (CCC, see below) is triggered by receipt of the notification of a transfer trigger event, such as:

a takeover by execution of "takeover commitments" (TOC, see below),
a signature of a predetermined arbitrator (or several), typically confirming the occurrence of an unexpected event (accident, sickness, fire, natural disaster, breakdown, etc.)
a decision made by the CCC commitment provider, the content of said notification comprising the signatures in accordance with said trigger conditions.

With each transfer trigger event is associated an amount in UA (also communicated by said notification), which is the damage associated with this event.

Care capacity commitment (CCC): A "care capacity commitment" (CCC) is
a commitment based on
  reserved balances (reserved for the CCC type of the commitment in question, globally for all CCC beneficiary entities of this CCC type) and
  a transfer capacity (potential transfer) of UA to the entity who is the beneficiary of the commitment in question,
whose purpose is
  to transfer UAs
    by CCC's commitment provider entity to the entity receiving the commitment (including, if applicable, several CCC commitment beneficiaries of the same type) when the latter notifies a transfer trigger event corresponding to the transfer conditions of the CCC type of the commitment in question,
    and reciprocally, to have UAs transferred by the entity who is the beneficiary of the commitment in question (and, as appropriate, other CCC beneficiaries of the same type downstream), and, where appropriate, by CCC beneficiary entities further downstream, to the providing entity of the commitment in question, whenever that providing entity notifies a transfer triggering event corresponding to the transfer conditions of the CCC type of the commitment in question,
these transfers being generally carried out within an "atomic transaction" (subject to rollback) and according to cascading steps described below. Thus, by design, CCC providers are motivated because they are likely to benefit from downstream UA transfers (in the event of triggering events of the type of such CCCs).

Figure 2A:
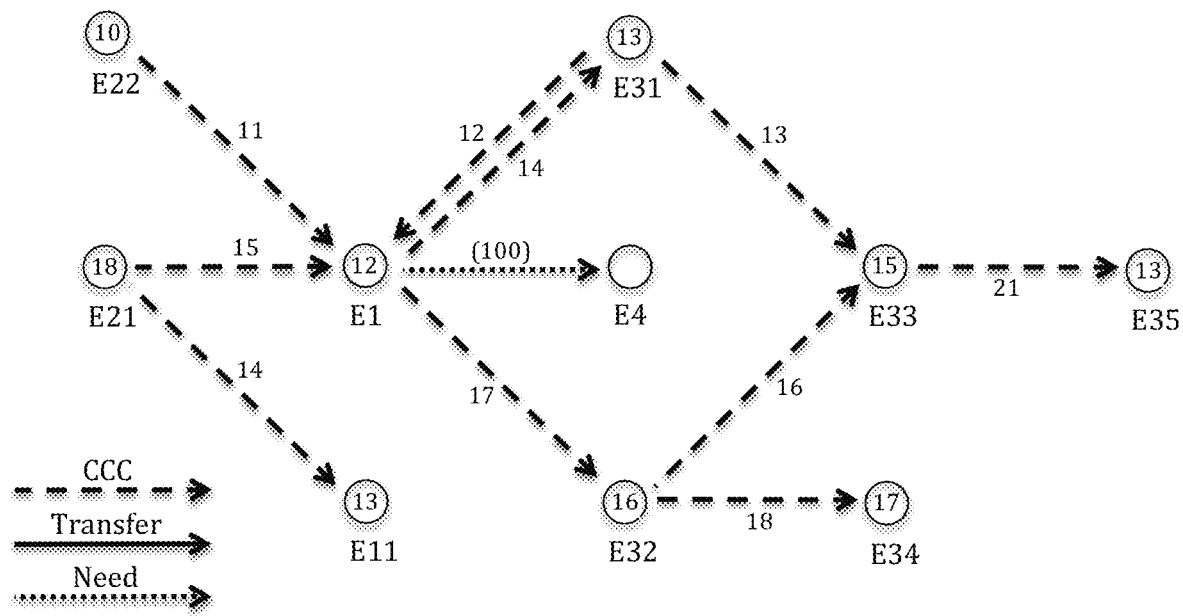
Figure 2B:
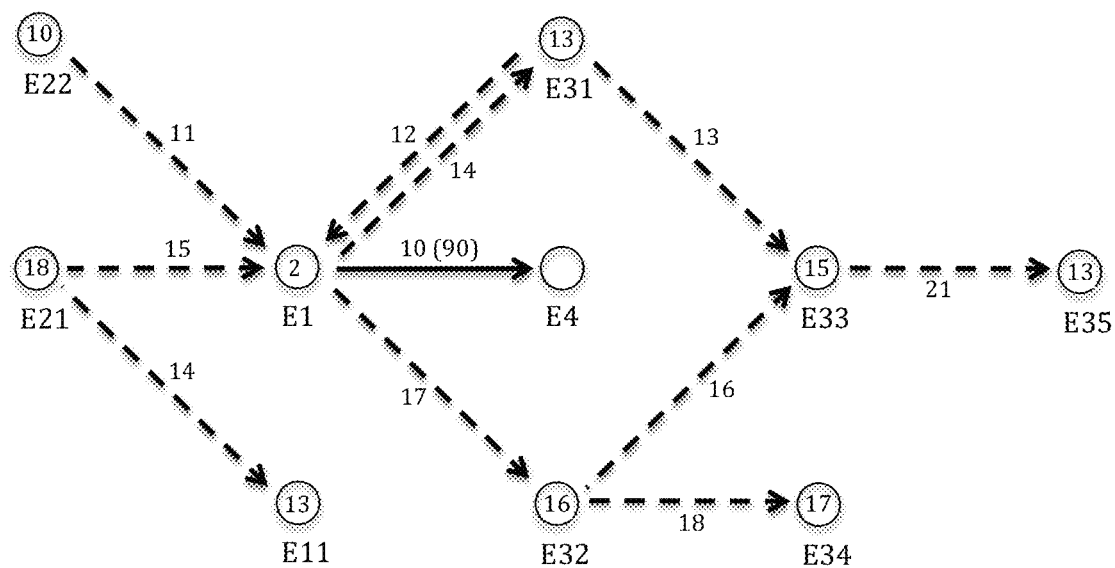

To this end, with each entity, for each type of its CCCs generated, is associated "CCC balances" (see below), each of which being dedicated to all such CCCs generated by this entity, and each CCC to a given beneficiary entity specifies
  its type of CCC (which will make it possible to verify the signatures if necessary required by this type of CCC) and
  a capacity restricting the transferable UA (per unit of time) to that particular beneficiary entity (the actual transferred UAs, of course, not exceeding the CCC current balances).
Thus, the execution of an atomic execution transaction of CCC involves
  the entity which undergoes said triggering event (E1),
  its entities upstream (E2.),
  its entities downstream (E3.) and
  the entity (E4) to which the UAs corresponding to the "damage" caused by the event in question are to be transferred in fine (at the commit of said atomic transaction) to remedy it (see FIG. 2). All commitment transfer transactions made by the CCC are thus for the transfer of commitments from the issuing entity E4 specifically. (Note that FIG. 2 do not detail the CCC balances distinctly by issuing entity but have abstractly an overall CCC balance in UA at each node.)
The method for performing a CCC comprises the steps of:
A—As shown in FIG. 2A by way of example, first a triggering event of a given type (event undergone by the entity E1) causes the need for a transfer (of 100 UA) by E1 to an entity (E4) provided for this type of event (this is shown with the dotted arrow).
B—In response, E1 performs UA transfer transactions to E4 for the most part of the resulting damage (100 UA), depending on its current CCC balances as well as the current state of the exchange network (to trigger these transfers, E1 added 'Amounts–' for the issuing entity E4 and the quantity 100 UA). FIG. 2B shows that in this example only 10 UAs could be transferred to E4 and that there remains in E1 a CCC balance of 2 UAs of various issuing entities which could not be exchanged on the exchange network.

In the case where the damage is not fully settled (as shown in FIG. 2B, this is the case in the example under consideration since 90 UA is missing), E1 sends to the provider entities of the CCCs of which she is the beneficiary (E21, E22 and E23 entities) the notification of the occurrence of that event and the type of the CCC in question.

C—These CCCs, of which E1 is the beneficiary, allow it to benefit from upstream transfers, according to the respective capacities of these CCCs and their current balances of CCC.

(In a preferred embodiment, the quantities transferred from the upstream CCC providing entities are uniformly distributed among these entities for a first tranche corresponding to the lowest capacity between these entities and then for the remainder uniformly between the remaining entities, and so on until the damage is covered or all capacities are reached.)

Figure 2C:
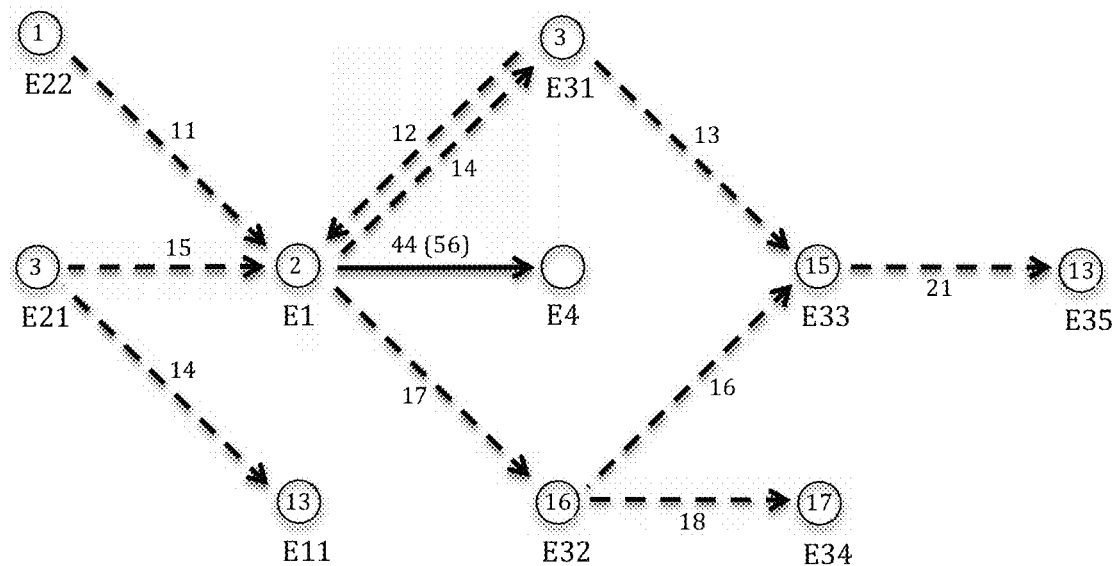

Thus, FIG. 2C shows that in this example E21, E22 and E23 respectively transfer 15, 9 and 10 units according to their respective CCC balances for different issuing entities and the capacity of their respective CCCs (i.e. the quantities of UAs transferred can not exceed the capacities of the respective CCCs to which they correspond and the values of the commitments of the given issuing entities that are transferred are less than or equal to the current CCC balances for these issuing entities).

In case the upstream transfers are sufficient, the atomic transaction of CCC in question is commit.

Figure 2D:
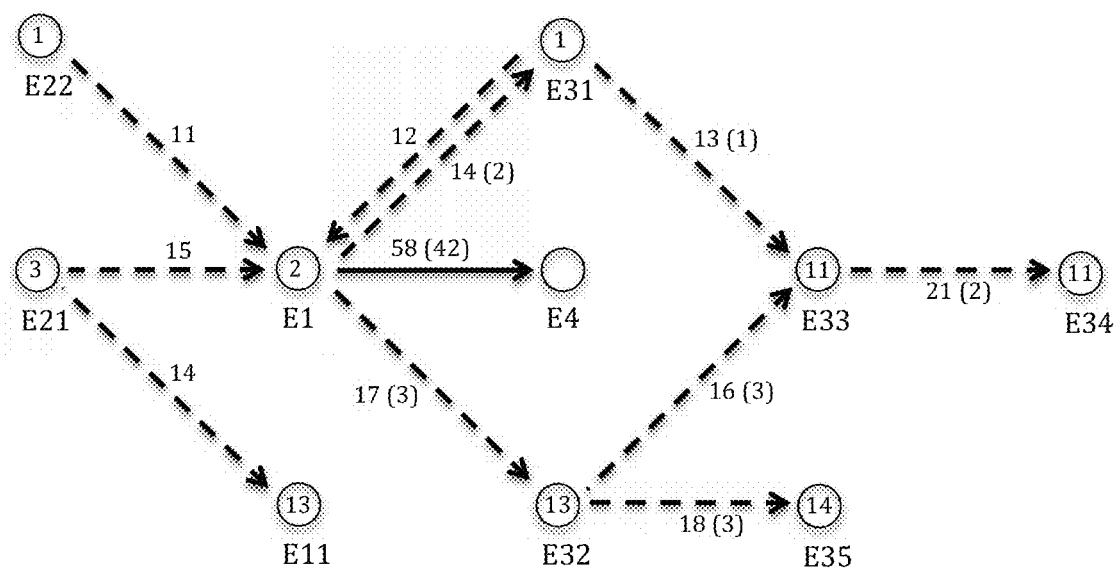

D—In the event that upstream transfers are not sufficient (which is the case in the example since there is a lack of 56 UA to be transferred, as shown in FIG. 2C) the CCCs of which E1 is this time supplier enable it to benefit from downstream transfers, following the CCCs of the same type (downstream, ie in the opposite direction), depending on, at each stage of the journey, the balance to be transferred, CCC balances (for specific issuing entities, see below) at the level of each new entity involved on a downstream path, also according to the limitations specified for the type of the CCC (see below) and finally capacities not to be exceeded (the capacities of the weakest links on the roads crossed). The amount of UAs transferred (if there are no cases of "beholden"—see below—of any transfers previously made by E1 downstream, as described below and illustrated in FIG. 2E) is equal to or less than the result of a predetermined function (and specified for the type of CCC in question, in CCC's executable contract) applied to the respective capacities of these CCCs: For example, a 20% coefficient is applied to the capacities of first-level CCCs and typically this coefficient decreases slightly at each subsequent level. FIG. 2D indicates that for this example 2 UAs are transferred (indication (2)) from E31, 3 UAs are transferred (indication (3)) from E32, UA is transferred (indication (1)) from E33 via E31, 3 UA are transferred (indication (3)) from E33 via E32, 2 UA are transferred (indication (2)) from E34 via E33 and E31 and 3 UA are transferred (indication (3)) from E35 via E32.

Thus, a total of 14 UAs are transferred from downstream, bringing the total transferred to E4 to 58 UA and thus the shortage to transfer to 42 UA.

Figure 2E:
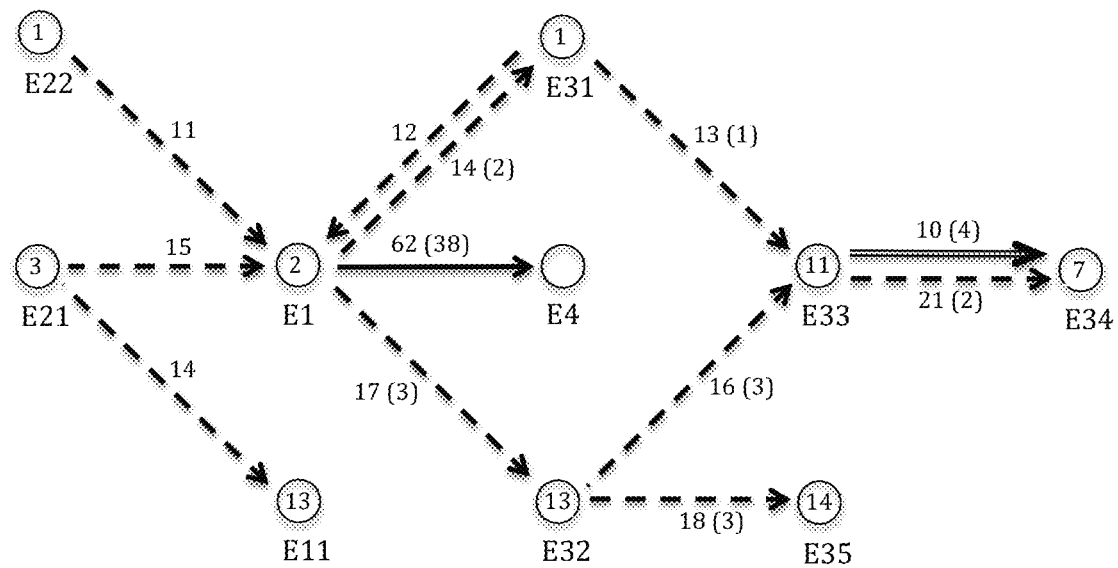

E—The concept of "beholden" and the corresponding step will now be described. When a downstream CCC beneficiary had itself received a transfer in the past from which it is still "beholden", its contribution to a "transfer from downstream" is greater. For example, FIG. 2E shows (by a double arrow) the case of a transfer made in the past of 10 UA. The idea of this aspect of the invention is that these UAs represent, in some ways, an accountability of E35 (with its meaning of "beholden") towards E33 first, but also towards the entities upstream of E33 for the same CCC type, in each case in relation to the capacities of each of the CCCs traversed in question (acting as a filter). The existence of this accountability of 10 UAs results in this example in an additional downstream transfer of 4 UAs (as indicated in the figure on the double arrow), these 4 UAs resulting from the application, to said quantity of 10 UA, of a coefficient whose effect is to decrease the quantity to be transferred as a function of the number of levels crossed downstream (in this case two levels have been crossed in each of the two paths of the example presented at 2E: the path E1-E32-E33-E34 and the path E1-E31-E33-E34—note that when several paths exist, they accumulate, so as to favor the entity upstream, since each path is likely to increase the overall capacity of the 'transfer from downstream'). Thus, as shown in Figure E32, the total transferred is now 62, leaving a shortage to transfer to E4 of 38 UA. As a result of this 'transfer from downstream' of 4 UAs, this accountability of 10 UA on this CCC is reduced by the same amount and is thus updated to 6 UA.

As already mentioned, all transfers from the downstream are filtered by the capacities of the CCCs located on the crossed road. If, for example, the capacity of the CCC from E1 to E32 was not 17 UA, but 2 UA, only 2 UA could have been transferred downstream via E32, E34, E33 and E35.

In the event that downstream transfers are sufficient, the atomic transaction of CCC in question is commit.

F—In case downstream transfers are insufficient (in the example, there is now 38 UA), E1 notifies the entities (E2) provider of CCC upstream and the CCCs of which they are beneficiaries which allow E1 to benefit from indirect transfers from the upstream, that is to say transfers by entities upstream of the entities E2 (according to the respective capacities of their own CCCs towards them, as well as their own balances of CCCs, for the same type of CCC), recursively. E1 thus benefits from increasingly indirect transfers by increasingly upstream CCC provider entities, until the damage is entirely settled (by transfers of AUs from E4) or a max level of recursion provided in the CCCs is reached.

G—Finally, in the event that indirect upstream transfers are not sufficient to settle the damage, E1 informs E4, which can then provide E1 with a "capacity commitment" ("CC", see below) and makes the CCC atomic transaction in question commit or otherwise deny the transfer transaction in response to the transfer trigger event, which then results in the rollback of the CCC atomic transaction in question.

The implementation of commit/rollback transactions in the invention is described below (see "Wallet Node").

Triangulation: As described and illustrated further on with the story of "Ben and Celia", which emphasizes the motivation of CCC providers, downstream transfers (by downstream CCC beneficiary entities) benefit (potentially) to other entities (analogously to transfers from downstream that E1 benefit in the example above): these other entities that also benefit from downstream are those whose provider entity CCC upstream is also upstream of CCC beneficiary entities downstream but by other paths (not via themselves). In other words, said "E3" are downstream of said "E2" without being downstream of said "E1".

Figure 2F:
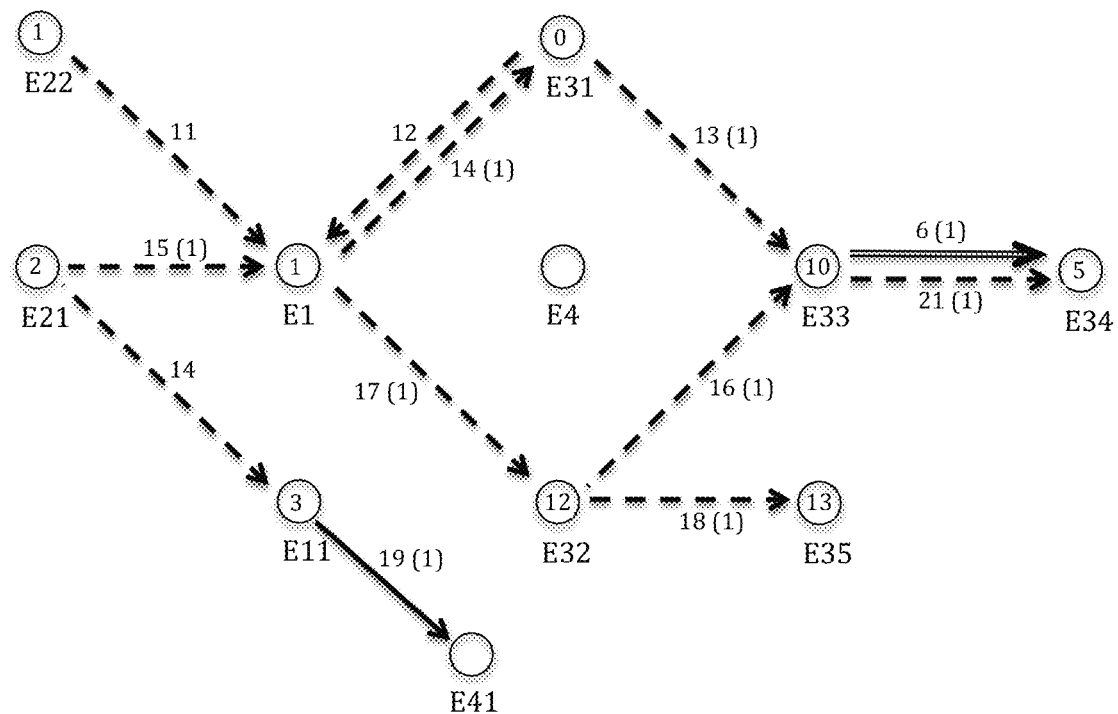

Thus, FIG. 2F shows the example of a triggering event undergone by an entity E11 (instead of the entity E1 of the above example, in correspondence with the step A presented in FIG. 2A) for a damage of UA to be settled to E41 (instead of E4).

In step 'B', E11 transfers 10 UA to E41 (10 UA of its 'Amounts +' from its CCC balances, which it has been able to exchange to obtain commitments of E41 of the same value).

In step 'C' (transfer from upstream), E21 transfers 1 UA to E41.

In step D (transfer from downstream), in this example (for simplicity), from each entity downstream of E21, namely E1, E31, E32, E33, E34, E35, 1 UA is transferred to E41 on each path.

At step 'E', E34 (which is currently beholden for 6 UA) still transfers 1 UA.

This makes a total of 19 UAs transferred, by all the entities of the example, except E22 which is neither upstream nor downstream of E21, and there remains a shortage of 1 UA to settle the 20 UAs of the damage, for which E41 accepts in this example to generate a "capacity commitment" ("CC", see below) and then makes to commit the atomic transaction for the execution of this CCC of which E21 is the provider entity and E4 the beneficiary entity. It should be noted that if other entities provided CCCs upstream of E21, step F (indirect upstream transfers) might have made it possible to fill this shortfall by 1 UA.

Advantageously, limitations can be implemented in the CCC executable contracts (according to their respective types), in particular for the case of from downstream transfers by triangulation, an example of which is given above, enforcing for example that: the total of the quantities received, by execution of CCC of a given type, from downstream but by triangulation via an upstream entity (such as E21) does not exceed a threshold which is a function of the total of the effective transfers by this upstream node (E21) by executing CCCs of the same type (this limitation can be implemented by maintaining a 'right to triangulation' amount, similar to the implementation of 'beholden' described above).

Thus, in order to summarize, the execution of a CCC from an entity "A" to an entity "B" generates in some way an implicit reverse commitment both from B to A and from triangulation: from B (as well as entities downstream in the CCC network) to any entity beneficiary of a CCC provided by A (and of the same type) already generated or generated in the future. Advantageously, it is also provided that the implementation of the CCCs enforces that the execution of these implicit commitments—by B and by the entities downstream of B on edges of the CCC network—is a condition for all CCCs of the same type and on the same edges. In other words, when B or an entity upstream of B does not respond to such an implicit commitment, the edges in question are penalized for it with respect to a potential contribution by A or by other entities, existing or generated in the future, on these same edges.

Balance of CCC (of a given entity, for a given type of CCC and for commitments of a specific issuing entity): Total value (in UA) of the commitments of a specific issuing entity to the particular entity, which are reserved for transactions of UA transfers by executing CCC of the given type. With each entity, for each set of commitments of a different issuing entity, this balance is associated (explicitly or implicitly), and the non-zero balances are stored there (non-memorized balances implicitly have a zero balance). These balances may fluctuate, but any change in a CCC balance must comply with a given notice provided for in the CCC.

Capacity commitment (CC): A capacity commitment makes it possible to compensate for a transfer of UA to be performed, by a UC ("Used Capacity") consumed capacity update, the current available capacity being then reduced by the quantity of the consumed units in question. The capacity commitments form a flow network, the nodes of which are the provider and/or beneficiary entities of CC and whose edges represent the CCs to which capacities and UCs are associated (and form paths in the network of flows), through which UCs can be updated to compensate for transfers to be performed.

Takeover Commitment (TOC): The commitments described so far can be used in a process for managing commitments to take over supply commitments, forming a sort of clearing house in P2P, where Commitments for the supply of goods or services acquired from original providers are carried out by other entities (to which the acquirer transfers those commitments), such other entities supplying those goods or services in place of the original suppliers, and these other entities are then automatically compensated by the original providers.

Thus the commitments that can be taken over become (partially) "fungible".

Each supply commitment has a value in UA (default value of zero), for example for renting a room mentioned above, the commitment to provide access on demand has a certain value (for example a monthly rental has the value of 100 UA). According to this aspect of the invention, a plurality of entities providing a commitment (providing goods or services)—for example, several landlords (room owners), but these entities may also represent suppliers of goods or services of different kinds—interconnect by means of TOC commitments meaning "I agree to take over your commitment against compensation for its value from you" thereby forming a TOC network, in the sense that an acquired commitment (against, for example, 100 units of account representing its value) is equally valid with respect to all the other entities of the plurality which have provided a TOC (e.g. for acquirers to have access to any vacant room of such owners), the entities in question then automatically compensating each other according to the method of the invention.

The compensations in question are carried out either individually by each one or by execution of CCC (described above), with respect to triggering events such as these compensations.

Thus, when in a takeover network, a commitment (V1) of a given value (for example 100 UA, as in the example of FIG. 2, which are complementary to FIG. 3 explained hereinafter) is generated and transferred to an acquirer (Ea), by an entity representing a first supplier (E1), against a commitment (V5, from another entity), and Ea tries to make V1 to be executed by an entity (E4) representing another supplier (for example to access a room of another room owner represented by, or whose lock is controlled by, said entity E4), the latter (E4) being a commitment provider entity for a takeover commitment to the original supplier E1.

Figure 3:
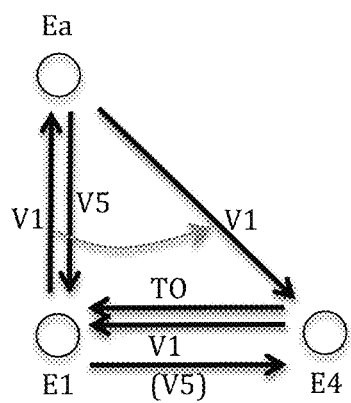
FIG. 3 illustrates the management of a multi-supplier commitment.
Figure 4A:
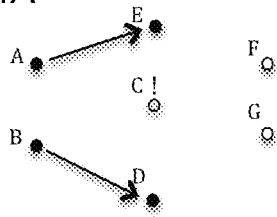
FIGS. 4A-F is a simplified example of a Care Capacity Commitments chain implemented according to the invention, FIG. 5 schematically illustrates the constituents of a chip implementing a Wallet Node according to the invention, FIG. 6 schematically illustrates an anonymous identification process from a passport according to the invention, FIG. 7 schematically illustrates a method for transferring units of account involving two Wallet Nodes according to the invention, FIG. 8 schematically illustrates a method of blocking units of account involving a "helper" Wallet Node and a "helped" Wallet Node.
Figure 4B:
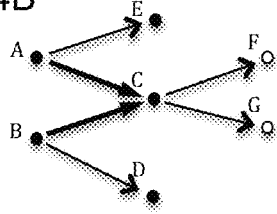
Figure 4C:
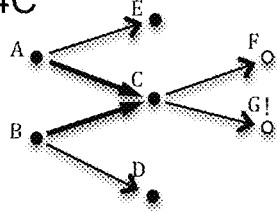
Figure 4D:
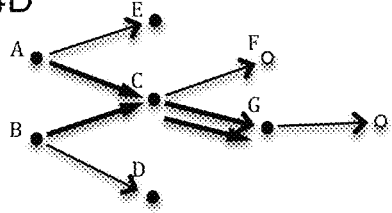
Figure 4E:
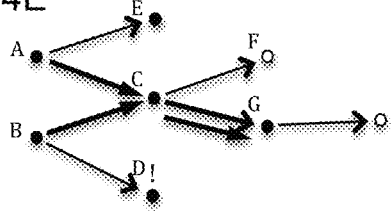
Figure 4F:
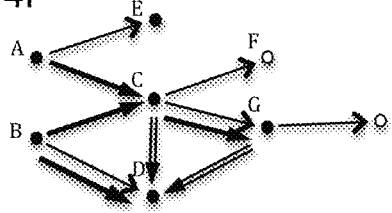

More specifically, FIG. 3 makes it possible to understand the steps of the method which are the following:

1. A supplier entity E4 generates (as commitment provider) a TOC, the TO commitment, for V1 commitments, to an entity E1 (as a TOC beneficiary).
2. E1 (this time as a commitment provider) generates a supply commitment (V1).
3. An entity Ea acquires V1 in exchange for V5.
(Note that V5 could also be a certain exchangeable commodity or totally fungible currency—classical money such as euro, in which case, in step 6 (see below), the execution of the TOC will consist in transferring this received currency to the effective supplier E4.)
4. The user (represented by) Ea wishes to execute V1 not by E1 but by E4 (this is represented in the figure by a curved arrow to the right) and for this purpose Ea transmits the commitment V1 (generated by E1 in step 2) to E4 in the context of an atomic transaction that will end in step 6.
5. E4 returns V1 to E1 in the execution of TO.
6. On receipt, E1 executes TO (transferring the UAs of the value of the received commitment V5)—the execution of TO implements CCCs for which E1 is the beneficiary—and following this execution, as described in the previous section, E1 notifies E4 of the result that E4 agrees, if applicable, to validate the transaction and execute, in place of E1, said commitment V1 of which Ea is beneficiary. Thus, operating CCCs (of the TOC type) for takeovers of takeover commitments allows to implement an automatic compensation network in P2P, wherein said compensations are fully supported by execution of said CCCs.

With reference to FIG. 4, an illustrative example of a possible implementation of the invention is a very simple history of such a chain in a network with nodes A to G, respectively representing Wallet Nodes (each implementing a node of the network) belonging to Alice, Ben, Celia, Dan, Emma, Fanny and Gino.

The story is told as follows (in italics):

Wouldn't it be nice if people who are are connected in various ways joined together to help each other, forming a kind of tribe of mutual support?

It's a simple, human idea. We refer to this as a tribe chain.

With the tribe-chain app, tribe chains form a network that is designed to scale. It's a pure p2p network, that is, without intermediaries, where caregivers see their aid extended, forming chains, and amplified all along.

Meet Celia. She's lost her iphone today and doesn't have the money right now to replace it. Without it, she's lost!

Celia's on Facebook along with her friends Alice and Ben.

Alice and Ben are frequent users of the tribe chain app (the system of the invention), and they are always ready to help their friends. Currently, both have set aside some money and have declared their intentions to care about Emma and Dan respectively (this is represented in part a) of FIG. 4 by an arrow from A to E and an arrow from B to D.). In the tribe-chain app, "to care" means to be ready to help whenever needed.

Even though Celia is not a tribe chain user, when Celia signals (this is represented in part a) of FIG. 4 by an exclamation point on C), Alice and Ben decide to help using Tribe Chain (this is represented in part b) of the figure by arrows representing transactions of units of account from A to C and from B to C). This connects Celia to the network. (This signaling can be carried out, for example, by pushing information representative of this difficulty to the friends of a social network, or when the friends connect to such a social network on which an indication of the difficulty is signaled.)

With the funds from her friends, Celia happily replaces her iphone. She is really grateful and she also feels indebted. So Celia decides to join tribe chain. She puts aside some money the next month (via an appropriate man/machine interface, she feeds the account of her node—this is represented in the figure by a solid node) and declares that, not only does she "care" about Alice and Ben (this is automatic in the app), but she also cares about her pals Fanny and Gino (represented in part b) of the figure by the arrows from C to F and G).

Now Gino has a problem (this is represented in part c) by an exclamation point on the node G), Since Celia cares about Gino, a contribution from her is triggered.

Gino feels indebted, so he puts aside some money and he declares that he cares about one other node in the network (also shown in part d). Meanwhile, other members are offering valuable moral support and helpful suggestions to each other. Thus, in various ways, a broader, more robust community is continually forming.

Support from Gino to Dan is triggered as well since, in a way, Gino also has been helped by Ben, indirectly through Celia.

So Ben is happy. He's particularly happy that Celia and Gino contributed, since his node didn't have enough money to help Dan. And for Celia and Gino, this is a good opportunity to meet Dan!

This kind of "triangulation" is quite justified. After all, Ben has used up his money helping Celia. Now, when Ben would like to help Dan, Ben's money is, in a sense, with Celia. So it's natural that the money should flow from Celia to Dan.

And thus it does, automatically, even though Celia does not know Dan.

Celia, in effect is repaying Ben by helping Dan.

This mechanism of contributions triggered by indirect relationships of indebtedness is unique to the tribe-chain app.

Dan has a problem (this is shown in part e) by an exclamation point).

As he had stated, Ben helps Dan (this is shown in part f)—and the first arrow from B to D, representing its intention to help, was shown in part (a), but to the extent that he has funds left. Indeed, Ben had previously helped Celia.

In the system (implemented in a Wallet Node executing the executable commitment in question, the tribe-chain app providing the user interface in the user terminal) according to the process of the invention, not only does Ben help Dan, but also Celia helps Dan (this is represented by a double arrow from C to D in part f).

This "triangulation" is perfectly justified. After all, Ben used his own money to help Celia, and now, when Ben wants to help Dan, we could say that his money is at Celia's.

It is therefore natural that the funds now go from Celia to Dan. This contribution is triggered automatically, even if Celia does not know Dan.

One can see this triangulation like Celia who reimburses Ben by helping his friend Dan.

In addition, a contribution from Gino to Dan is also triggered automatically (this is shown by a double arrow from G to D, in part f) because in some way even Gino was assisted by Ben indirectly via Celia.

In a Wallet Program that implements such a commitment on direct or indirect accountability relationships, an implementation will be preferred where the more indirect the accountability (for example, the accountability of G to D), the more the corresponding contribution (in this case, from G to D) is relatively less (compared to C's contribution To D).

On the other hand, it can be considered that aid, for example from Ben to Celia, can be a "gift" (without interest) or a "loan" (with interest).

The following two criteria are also considered:
if the aid in question is for an unforeseen event (disaster) or an aid responding to any wish (which is not a disaster)
and if the units of account are ordinary money or in the form of vouchers, and for an aid—for example Ben wants to help Dan—the algorithm determines the contributions of a downstream chain in relation to these criteria, as follows:

IF unforseen and vouchers THEN distribute contributions downstream in the chain, for the amount necessary to handle the claim in question (whatever it is), ELSE IF unforseen (and not vouchers) THEN distribute the contributions downstream in the chain, for the amount necessary to process the claim in question but up to the amount of the initial aid (here from Ben to Celia), OTHERWISE only the node assisted by the initial help contributes and no more than the amount of initial help (here from Ben to Celia).

Distributing means:
If the string is for example Ben→Celia→Gino→Henry this represents n=3 contributors downstream;
Let m=n+(n−1)+(n−2) . . . till zero, so in this example m=3+2+1=6;
Celia pays n/m=3/6, Gino pays (n−1)/m=2/6, Henry pays (n−2)/m=1/6 of the needed amount+ Interest in the case of a loan).

The algorithm proceeds from the upstream to the downstream and, in the case where there is not enough funds at one of the nodes, it resumes at the beginning from the current node and for the amount remaining necessary.

Of course, in the example we have just seen, if recently other nodes that have directly or indirectly helped nodes in difficulty have also said they are ready to help Dan (which, in the example, has just pointed out a difficulty), not only said other nodes but also said nodes in difficulty which have been directly or indirectly assisted by said nodes now help Dan also, to the extent of the funds available at these nodes, for an amount which depends on the length of said indirect chain (this is performed by the Wallet Program which implements their executable commitment).

When a contribution triggers following a declaration of intent to assist (such as from B to D or from C to G in the example of FIG. 4), the user (B or C respectively) may be asked to confirm his intention to contribute. Alternatively (or in addition), the executable commitment in question may also provide for the confirmation of a third party called "arbitrator" in the following (confirmation directly issued by the Wallet Node of the arbitrator, described below, or by the delivery by the beneficiary node—D or G respectively—of an electronic signature of the arbitrator) and the help is triggered automatically as soon as this confirmation. Typically, this is how insurance works: in the event of a claim, an expert (the arbitrator) endorses the payment to be executed.

In contrast to these contributions triggered by an aid intent, automatic contributions due to accountability (such as C to D or G to D) do not require confirmation (confirmation is already at the level of Confirmation from B to D).

Finally, compared to a mutual (or traditional insurance) involving reciprocity of commitments, it is remarkable that the network approach of linkages of risk covering commitments of the invention is more inclusive, since these links may be unidirectional and are not necessarily created for economic reasons—one does not always have the incentive to invest in the pool of the lowest risks (in the sense of risk pooling). The typical example is that of a grandfather who sets aside a certain amount of units of account to participate in the coverage of a possible deductible to pay in case of illness or accident, deductible in the insurance policies of his grandchildren—it is a unidirectional link of risk coverage. In this example, the risk covered is to pay this deductible and the potential help that each grandchild receives is made up of the reserves of those who have links to him.

According to another aspect, which can be implemented independently of the invention described in the foregoing, there is provided a system and a method by which the deductible that an insured node proposes (for the insurance policy) to an insurance (ie, an entity such as an insurance or reinsurance company) can be determined dynamically according to the amount of units of account that this node is willing to pay in the event of a disaster and current reserves of nodes that have links to it for this purpose, the premium which he then has to pay to the insurance being determined by integrating the premiums due at each moment according to the deductible which results from his own situation and from the situation of the said nodes which have a commitment to him.

The same Tribeschain network support app can be used to form a "common pot" with friends, to cover themselves with certain risks. And for the highest levels of risk, which are not covered with such a common pot, users of the tribechain app can find traditional insurers, but according to the method of the invention, the premiums to be paid by each user to the insurer will be flexible insofar as the common pot available to each node is variable.

One can illustrate this aspect by this story:

P2P insurance is the most basic form of risk sharing. It's likely how insurance first began. For example, what if I, you, and several others who know each other, came together and decided that we would help each other when one of life's difficulties arises, say a house fire.

The same Tribe-Chain app you learned about in our first story can also be used by each user to form a "pot" with friends, to prepare for such events.

And, for those higher levels of risk that are not covered within the tribe, the users of Tribe-Chain will rely on insurers as needed.

Because Alice and Ben are willing to take responsibility for a deductible of 3,000 Euros per claim, by using the Tribe-Chain app they can find a way to pay a lower premium.

3,000 Euros per claim? Yes, because Alice and Ben think—with good reason!—that it is unlikely that their two houses will both catch on fire this year, and they are willing to take that risk. Indeed, if that should happen, the Tribe-Chain app would help them get a loan to find the missing 1,500 Euros for each of them . . . .

Now each of them may choose an insurance policy using the Tribe-Chain app that will cover them with a deductible of 7,500 Euros per claim.

The insurance policies proposed by the Tribe-Chain app are able to dynamically adapt their premiums according to the support each node receives in the network.

Alice and Ben each have a house and decide to set aside 1500 € each to have a common pot of 3000 € for the case where the house of one of them would burn.

Tribe-chain is also the p2p risk cover app (Wallet Nodes) that allows it to be done in a secure way, as well as to call on an insurance company to cover the amounts beyond the common pot put in Place, this common pot being seen as a deductible.

By using tribe-chain, Alice and Ben find an insurance company offering a lower premium given the deductible of 3000 € per claim, that represents their common pot.

Alice and Ben think it is unlikely that their two houses will burn the same year, and they are willing to take that risk. Indeed, in case this happens, everyone could borrow the € 1,500 missing, the common pot covering the deductible for only one claim, and the app tribechain would help them.

Time passes, and 3 other owners, Celia, Dan and Emma join them. They are now 5, and to them 5, they were able to form a common pot of 7500 €, 1500 € each.

All five are of the opinion that it is unlikely that more than one of their five houses will burn during the same year, and they are willing to take the risk, even if they had to borrow if it happened, Using the tribe-chain app.

Now, each of them can choose an insurance policy that will cover them with a deductible of 7,500 euros per claim, and thus with a much more advantageous bonus.

As can be imagined by combining the two examples presented so far, the situation of each node, representing the deductible that it has at disposal, can vary. Indeed, It is not necessary for each node to have a commitment to each other node and the reserves on each node may vary, all the more so if they commit to cover a plurality of risks of a plurality of nodes and variably in time;

potentially, contributions downstream in the chains are available in addition (as described above).

The premium due can then be determined by integrating in time the actual deductibles recorded at each moment.

Thus, in these examples, the insurance policies offered by the app tribe-chain are able to dynamically adjust their premiums, using the method, according to the reserves available on each node at the current time in the network.

Here is a more complete history by way of illustration of the possible implementations of the invention:

1. Ken and Lila

Ken emigrated to England twelve years ago from his village on the disadvantaged island of Fare-Thee-Well. He now has a successful career in London, and has been happily sending money back to help those family members who have remained on the island.

Ken's niece Lila has been trying to launch a small grocery store on the island, which is much-needed in her neighborhood. She works two jobs and has twice saved up money for her dream store. Ken contributed to Lila's grocery seed money as well. But both times the funds have been severely depleted by medical emergencies. First Lila had a seriously infected spider bite that sent her to the hospital, and then her grandfather required cataract surgery.

2. Lila asks healthcare professionals to join

When talking with some friends in London, Ken hears about the Tribe-Chain Bootstrap app for Android. It seems perfectly designed to solve Lila's and the family's problems, problems that are common to people in disadvantaged regions.

Ken is happy to learn that with the Tribe-Chain app he can purchase healthcare credits, also known as vouchers, that can be used by his extended family in an emergency. Ken calls Lila to explain that he would like to do this, but first she must approach her local healthcare providers and have them agree to join Tribe-Chain.

A number of the island's pharmacies, doctors, surgeons and various clinics welcome the idea of being paid up front for credits for their services. So they each sign on to Tribe-Chain. Ken specifies the voucher amounts his family is likely to require in total. Lila divides this amount to different local healthcare providers as seems appropriate to her family's needs. The providers receive notification of the voucher requests, which they validate. This means that they are issuing vouchers that they pledge to honor. Ken pays for the validated vouchers.

3. Ken Invests in Vouchers for Lila's Grocery

Now that Lila's extended family has urgent needs for medical care assured, and Lila can concentrate without distraction on her new endeavor, Ken feels he can invest in Lila's dream grocery without risk.

Ken decides to invest in Lila's grocery also using Tribe-Chain, because the app allows him to specify the kinds of goods and services he will pay for and modify the level of contributions as the grocery grows. The app also allows Ken to automatically monitor all of Lisa's purchases as they are made, so he can analyze their profitability and provide direction to his niece as needed.

Then Ken learns more about the Tribe-Chain Bootstrap app, which would allow him to bootstrap a tribe and customize it with rules he chooses. He becomes quite excited about the potential of Tribe-Chain tribes on the island of his birth. He learns that the potential benefits extend far beyond those available to business owners like Lila. Ken is amazed to learn that the spread of Tribe-Chain on the island could actually lead to the elimination of poverty in much of the community through what is known as a Mutual Credit system. But that is down the line. First he must address the needs of his family on the island.

4. Lila Asks Wholesalers to Join

So Ken moves forward. He explains to Lila that if she approaches her potential vendors for her store and convinces them to join Tribe-Chain, he will purchase vouchers that she can use to stock her grocery. That sounds great to Lila!

Lila has agreed that, for the family's basic needs, she will take money only from the store profits, not any seed money. And in Ken's Bootstrap design, as Lila restocks by purchasing more vouchers, additional small contributions are triggered from Ken as an additional incentive. Thus Ken's investment will continue to be used to restock and expand Lila's store.

Lila begins by going to the wholesalers she wants to work with one by one. She explains that if they agree to issue vouchers they will be paid in advance for the purchases she needs for her store. This will be done via the Tribe-Chain app that they can download on their smart phones. She explains the process of the issuing of vouchers, which will be identical to the one used with healthcare providers. Naturally, the vendors see the benefit of being paid in advance in this way, and they agree to join Tribe-Chain.

5. A Tribe for Island Businesses

Lila is thrilled by her uncle's generosity. After a time however, she realizes that she is not that accurate at figuring out how much she needs from a particular vendor. Sometimes she hasn't enough vouchers from her soft drink suppliers, but she's left with more than she needs from her snacks suppliers.

Ken happily tells Lila that he has learned of a way to address this issue. Using the Tribe-Chain Bootstrap app, they can now create a tribe, an association made up of island businesses. If Lila's suppliers join the tribe and issue tribe credit vouchers, Lila will be free to allocate her resources where and when she needs them. Lila likes the idea of naming her tribe Sphinx Colibri after an amazing hummingbird-like moth that lives on the island of Fare-Thee-Well.

The Sphinx Colibri Tribe

Lila approaches her ideal grocery suppliers and invites them to join the Colibri Sphinx tribe. Lila explains to them that this tribe will contain all kinds of island businesses. As a tribe they will attract new customers who want to take advantage of discounts for group buying. And should they join the tribe, the suppliers will automatically be allowed to trade with other members of their tribe using a line of credit which has been calculated according to their projected sales. This way of trading within the tribe is called Mutual Credit.

Lila assures these suppliers that she will be very motivated to sell their services, to get other island businesses to purchase from them using the app. She plans to advertise their products on social networks, starting with one on the Tribe-Chain app itself because the more people click on her ads, the more she will earn in discounts. Initially, her discounts will be subsidized for by Ken as an incentive, for a period of three months, and then it will be subject to reevaluation.

This is called networked buying, whereby the advertised links make a discount available to Lila and those who click on her links.

Lila explains that ad templates have been set up by Ken that they can use for their products. A 1% discount is the default discount configured by Ken to encourage discount thinking. But Lila suggests that they change it to something higher, at least as a start.

In addition to prepayment, the potential for increasing their customer base plus the ability to buy goods and services on credit, convinces a number of reputable vendors to join the Colibri Sphinx Tribe and issue credit vouchers for sale.

6. Rebalancing

The great advantage of buying within a tribe is that generally tribe vouchers are fungible within the tribe. They act as a common currency. They are tribe-wide credits, in contrast to the kind of vendor-specific credits Ken bought from individual vendors before they joined Sphinx Colibri. Tribe-wide credits may be purchased from one vendor in the tribe and then used interchangeably with any other tribe vendor.

This way, if Lila buys vouchers worth 100 euros (known as Sphinx Euros) from her soda supplier and vouchers worth 100 Sphinx Euros from her snack vendor, Mr. Snax, if the snacks she already has aren't selling as quickly as the soda, she could choose to just restock her soda supply with the entire 200 Sphinx Euros. This gives her flexibility to spend where and when she likes within the tribe.

Since tribe buyers may buy vouchers from one vendor and to use them for products or services of another tribe vendor, some vendors, like in Lila's case the snack vendor Mr. Snax, may sell more vouchers than are redeemed for products. In other cases vendors like her soda man, Mr. Glub, may have more demand for their products than credits paid for. So potential vendors are informed that there may likely be a need, from time to time, to rebalance funds for vouchers within the tribe.

When it comes time for rebalancing, the financial risk is well-covered by a system wherein there is local sponsoring by people who know and trust each other (so this is a particular case of the "caring" we learned about in Video 1). To become a tribe vendor you must be sponsored by two existing vendors in the tribe. Each new vendor sponsors two other vendors as they enter the tribe, guaranteeing up to 20% of any risk of underpayment. The sponsored in turn must sponsor their sponsors. So each vendor will have at least four sponsors or guarantors (They may require more as sponsors can stipulate how much risk they are willing to shoulder). And since tribe buyers also agree to shoulder a small amount of risk, no one participant would be responsible for more than 20% of the risk.

Thus, with this risk hedged locally (between trusted peers) in a manageable way for all concerned, the tribe will tend to spread. With confidence that all the risk is covered among peers who know and trust each other, no vendor has concerns about the tribe expanding. Each one of them realizes that the risk from new members they don't know or trust will be shouldered by others. So there is no risk for themselves there.

With four vendors covering 80% of the risk, the remaining 20% is covered by the buyer in an interesting way. Let's say Lila's vendor Mr. Snax is unable to promptly rebalance the extra income he received for unredeemed vouchers. Then Mr. Snax's vouchers would enter a temporary state of compromised fungibility. What that means is that, during this time, Lila's credits that had been bought from Mr. Snax would temporarily lose a percentage of their value when used to redeem products from other vendors. According to the rules set for this Sphinx Colibri tribe they would lose up to 20% of their original value if used elsewhere. (Rules set in a different tribe could set that penalty at less, say 5%.) In this tribe, Mr. Snax would be purposely penalized when he does not rebalance in a timely fashion. His vouchers would no longer be redeemable with other vendors at full value, earning him Lila's ire.

Lila would still be free to redeem vouchers bought from Mr. Snax at full value if used to purchase his products. But should she choose to use them with another tribe vendor, they could be worth as little as 80% of their original value. However, as soon as the vendor is in a position to pay back the discrepancy, to rebalance in full, Lila will be free to use those vouchers at their original value throughout the tribe. Note that, in this small community, she might well know and trust Mr. Snax enough to wait a few weeks if he confidently assures her that this is just a temporary cash flow issue.

In a case where Lila pays another vendor with the compromised vouchers of Mr. Snax, accepting a 20% loss of value, Mr. Snax's sponsors are actually each subsidizing their value with a loan. Mr. Snax is, in effect, rebalancing with loans that he is obligated to pay back. If one of Mr. Snax's sponsors does not provide his loan, then that obligation propagates to his sponsors, and so on.

The vouchers of Mr. Snax's defaulting sponsors also become compromised in their fungibility as a penalty, but for much less, since at each level, only up to 20% of the previous risk is taken. The penalty of the reduced fungibility of 20% is a powerful disincentive for any vendor, as it will certainly alienate his or her customer.

Note that while a first level sponsor would lend 20% of the amount of the default, if a first level sponsor defaults, a second level sponsor would only be required to lend 4%, and so on. While the risk does propagate around a defaulting vendor, the amount decreases quickly, by five times less at each successive level. So the burden soon becomes negligible.

7. Networked Buying

Naturally, it's in everyone's interest on Fare-Thee-Well, both buyers and vendors, to make the tribe as large and as varied a marketplace as possible. It is important that people feel confident they can redeem the vouchers they purchase for all, or as many as possible, of the goods and services they need and want on a regular basis. The unique Networked Buying feature of the tribe-chain system described in Video 3 encourages that to happen. Networked Buying is now done within the tribe using vouchers (Sphinx Euros) instead of euros.

The effect of Networked Buying is that new buyers see the advertised deals and begin to buy vouchers for those deals. Thus the population of buyers increases and more vendors join the tribe as well.

Now a very broad variety of products and services are offered in the tribe.

Ted, the leather-worker, wants to sell the new handbag he designed to the tribe. So he creates an ad for the handbag and places it in the tribe's Marketplace. Ted is happy to change the tribe's default discount on the ad form to 10%.

Lila loves the bag and puts Ted's ad on her facebook page. Mona clicks Lila's ad link and they both earn discounts. Now Mona's friend Uma clicks on Mona's ad link. This earns Uma a discount and Mona and Lila further discounts. So this has gone to three levels, each level earning discounts for both the clicker, and those with ads up the network chain. Lila can purchase her handbag either before or after buyers click on her link and will, in either case, earn back the discount in Sphinx Euros.

Word spreads of the great deals. More and more islanders are checking out the app, buying vouchers and purchasing, and discounts continue to accrue. The buzz spreads like wild fire within the community. Terms like Sphinx Colibri, tribe vouchers, and network buying soon become part of the local culture.

Businesses on the island are all abuzz about the benefits of network buying made possible by the Tribe-Chain app. Tribe members are creating T-shirts and banners advertising the tribe, so more islanders will download the app and shop with them. Whether they are wholesalers, retailers, fishermen, farmers, plumbers or handymen, anyone with a smart phone is looking into joining the Sphinx Colibri tribe.

The small hamlet of Wilton on the island has many tribe members. But there are not very many members over the hill in neighboring Modena. So the vendors from Wilton sponsor a booth at the Modena samba festival, with banners and brochures to lure the local buyers. But the Modena vendors immediately sense the danger of losing local customers to Wilton competitors. So they are the first to respond, quickly joining the tribe and issuing their own vouchers.

All the Sphinx Colibri buyers on the island are happy with the deals they can earn on their purchases and the potential for future discounts.

8. Mutual Credit: Providing for All

One of the most important features of this Tribe-Chain app, both for individuals and the economy of the community as a whole, is The Mutual Credit System. This allows vendors who are tribe members to purchase goods and services from each other using a line of credit commensurate with their production capacity.

Oliver is a fisherman who would like to sell his fish more widely to wholesalers. He had found two sponsors easily and has been selling vouchers successfully for several months. 1,000 Sphinx euros have been redeemed in the past month for his fish. The app figures his production capacity currently at 1,000 Sphinx Euros.

Oliver's net has been torn and needs replacing. When he goes to the net-maker he discovers that it will take two weeks to replace his net. He doesn't have any savings to seem him and his family through until then. However, even though Oliver has reached the limit of his credit (as determined by his capacity) when ordering his new net, the tribe still allows him to purchase what the algorithm has determined to be an average amount of the most popular goods and services redeemed every week among the wide variety offered. Built into the design of the Tribe-Chain app is the assumption that the most widely-ordered goods and services in a broad and varied tribe are those most essential for survival. So Oliver and his family can continue to eat.

Sam lost his family in a tragic fire when he was young. The fire left him blind and he's never been quite right mentally since. But the locals have all cared for him, considering him one of their own. A number of tribe members decide to sponsor Sam. So even though Sam can not actually produce anything, he also will receive the same basic goods and services, on an ongoing basis, that Oliver and his family are now receiving.

Within the Sphinx Colibri Tribe there is and always will be this safety net, providing the means of survival for even the poorest of tribe members. Without any need for government intervention, poverty among tribe members has been eliminated. No one among them will ever go hungry.

9. Fare-Thee-Well Urgent Care

And just as Ken imagined, the healthcare providers have been persuaded to join together to form The Colibri Urgent Care Tribe for services for unexpected events.

And as in our first video, Lila can help her family and friends as well in the Urgent Care tribe. But because Lisa is using vouchers that apply only to unexpected events, her helping potential won't be limited to the amount in her node. As her care chain expands, Lila's helping potential can be amplified down the line. Here's how it works:

Ken buys Lila 100 euros worth of Colibri Urgent Care Euros (100 CUCE's) with the idea that they can be used to help Lila and her family. Lila over time purchases 100 CUCE's in addition. Now 200 CUCE's are in her node. Lila then indicates that she "cares" for her mother, sister, grandmother and grandfather. As we learned in Video one, in the Tribe-Chain app, to "care" is to pledge help for people when they are in need. Lila offers 200 CUCE's to help her friend Mona who has broken her leg (because of those cute custom sandals!). Mona, over time, funds her node with 200 CUCE's. Later, Mona's friend Phillip has a kitchen fire. So 200 CUCE's flow from Mona's node to pay her repairs. Phillip now downloads the app, and puts 200 euros in his node.

Come winter, several months later, Ken's mother, who is Lila's grandmother, Ruby has a fall and requires care valued at 300 euros in surgery and rehabilitation. At this point, there are no vouchers left in Lila's node to help with her Mom's care. But because of the mechanism of triangulation that we learned about in Video One, since Mona has been helped by Lila (with 200 CUCE's) and Phillip in turn (with 200 CUCE's too), CUCE's from Mona's and Philip's nodes will automatically flow to the nodes of the people Lila "cares" for. So vouchers worth 300 euros (200 from Lila and 100 from Phillip) flow to Lila's mother Ruby. Unlike the circumstance in Video 1, in this tribe the exchange is in vouchers for urgent care only. Although 'some' protections are in place for the users of these tribe vouchers, there is no need for the same kind of safeguards to protect the system from cheaters as there might be in a cash-based system. So vouchers for the full 300 euros worth of vouchers will automatically flow to Ruby's care, even though this amount well exceeds the total of all the funds spent by Lila (or Ken) for her vouchers. Thus Lila's help potential has been amplified.

And, in time there will be ever more chains growing downstream which will continue to expand her help potential further.

As we finish our story, tribes are growing, the discounts are helping islanders to run profitable businesses and live well for less. Less affluent tribe members are assured a basic living, and many more people are getting the healthcare they need. Within the tribe people are extending credit to each other, allowing people to acquire what they need and businesses to grow. With the help of Tribe-Chain, Fare-Thee-Well is faring very well indeed!

Wallet Nodes (WN)

When Wallet Nodes (WN) interact, each message exchanged contains a hash of a program (executable code) to be executed by the WN receiving this message. The WN thus offers the functionality of the "executable commitments" described so far: each WN is an entity that has to fulfill commitments such as CCCs, transfers of commitments, etc.

The embodiment of the invention according to which a WN is implemented in the form of a system-on-chip (SoC) will now be described. Note that the same architecture principles as those described in the following can be used to implement the WN as trusted apps running in a secured zone of the main processor, in a smart phone or any other connected device, able to ensure that WN data is stored, processed and protected in an isolated and trusted environment (eg Trusted Execution Environment, ARM® TrustZone®).

The domain of homomorphic encryption is known, the purpose of which is essentially to enable encrypted data to be processed without being decrypted, in particular on the Cloud, the aim being to make cloud computers "blind". The same effect can be achieved with the system of the invention without requiring homomorphic encryption. Indeed, a WN implemented in a system-on-chip (SoC) can serve as a "blind proxy", in the sense that it decrypts incoming data to process them and provide encrypted output results without revealing neither the data received as input, nor the output data, nor even the program used to produce it (neither the source code, nor the steps taken, nor the working data, nor any other sensitive data).

A client computer (Client) can run its program (WP) on a blind proxy (WN proxy) by the following steps:

1. Client first gets the public key of the manufacturer of WN proxy (by any means);
2. WN proxy sends to Client the public key of WN proxy, signed by the manufacturer (certificate), and Client checks this signature against the manufacturer's public key (to ensure that it is indeed a certified WN by said manufacturer);
3. Client determines the hash of the WP (#WP);
4. Client encrypts the WP (§ WP) with the public key of WN proxy and sends it to WN proxy (and optionally also sends #WP);

5. Provide for WN proxy to then store the WP (and optionally also store #WP in association with § WP);
6. Client encrypts the input data of the desired execution (§ input);
7. Client sends to WN proxy: § input, #WP as well as Client's public key;
8. WN proxy decrypts § WP (corresponding to #WP) as well as § input;
9. WN proxy executes WP with said decrypted input, encrypts the results (§ output) with the client's public key, and sends § output to client.

At no time does anyone (not even the owner of WN proxy) access the WP, the inputs or the unencrypted results of the processing.

In clear, this aspect of the invention is implemented in a system for the secure execution of programs in an architecture comprising a set of equipments connected in a network, characterized in that it comprises, in at least one equipment, a System-on-chip (SoC) in which there is stored inaccessibly otherwise than by the SoC a private key of SoC, a SoC being able to communicate with another equipment only by messages and being able to execute programs only in response to the reception of messages, a SoC being able to communicate to other equipments a public key of SoC corresponding to said SoC private key and certified by the SoC manufacturer, an equipment being able to address to a SoC a message containing a program to be executed by the SoC, encrypted with said SoC public key, a SoC being able to store the encrypted program and a hash of the program before encryption, the equipment being able furthermore to send to the SoC a message containing input data for a program, also encrypted with said public key of SoC, as well as the hash of said program, and another public key for encrypting the result of execution of said program on said input data, for decryption by the equipment using its corresponding private key, the SoC being able to decrypt the encrypted program and, in response to such a message containing input data, (i) checking that the hash of the decrypted program to be executed on the decrypted input data matches the hash received with said encrypted input data, (ii) decrypting the input data received from the equipment, and (iii) only if there is a match between the hashes, to execute the program after decryption, to the exclusion of any other instructions, on the input data after decryption, to the exclusion of all other data, then encrypting the result of the execution with said other public key and sending the result thus encrypted, to the exclusion of any other result except those possibly provided by construction in the SoC, to the equipment, so as to ensure the inaccessibility without discontinuity of both the input data, its processing and the result of the processing.

The WNs thus serve as a "blind proxy" since they only exchange encrypted data that they decrypt but do not reveal, and since they perform the requested processings without revealing them either.

We will now describe the functionality of executable commitments of WNs acting as "entities" as described above.

When WNs interact, each message exchanged contains a hash of a program as a specification of an executable commitment, such as a CCC (described above), that the WN receiving this message should execute. (The transfers of commitments described above are the case where the reception of the said message triggers the execution of an executable commitment comprising the updating of balances for the respective issuing entities of the transferred commitments, as already described.)

When two WNs interact by messages including the same hash of a program to be executed, they necessarily execute two identical programs consisting of instructions for reaction to such messages received on either side and thus representing reciprocal executable commitments previously agreed between them.

The WNs can also exchange messages (WM) including different hashes (of different programs (WPs) to be executed), but whose match is guaranteed by means of a common specification of the WPs to be executed. In a P2P architecture, this guarantee is obtained by including in the WM, in addition to the hash of the WP, the hash of this common specification (in a very simple implementation mode, said WP hashes can be part of a WP hash list, and the hash of that list is also included in the WM exchanged).

The receipt by a WN of a WM (containing the hash of the executable code that generated this message) triggers in this WN instructions (known as "Root of Trust") which are secure and non-modifiable and which load the executable code whose hash matches said hash included in the received message. The execution which follows of this executable code in said WN is thus predetermined with respect to this received message and is capable of updating and generating yet other messages which themselves propagate this same hash to other WNs. The invention thus makes it possible to guarantee the executable commitments (described above) represented by the WPs: on the one hand the WN receiving a WM reacts according to the executable commitment specified in the received WM, on the other hand, this WM itself was generated under the same WP (since produced by the same WP executable code).

A SoC implementing a WN includes at least the following subsystems:
  a processor ("Microcontroller"),
  a "Wallet Programs" subsystem comprising WPs, any executable code, managing "Persistent State Variables" that are exclusive to them,
  a "Check/Load" subsystem comprising a specific executable code for selecting and loading WP,
  a signature subsystem "Sign" providing cryptographic functions, in particular the signature of WM in output and the decryption of WM in input,
  an "I/O" input/output subsystem suitable for receiving an input WM—metadata "Manifest" is associated with each WP, to specify the nature and structure of its inputs via the I/O subsystem.

Each WN is coupled to a device such as a smart phone or a computer with which it is able to communicate via the I/O subsystem.

The WNs are able to interact with each other in a network and, via the I/O subsystem,
the WNs are able to exchange WMs including the WP's hash, and
in response to receiving a WM, said Check/Load executable code selects and loads, from said Wallet Programs subsystem, the specific WP whose hash matches said hash included in said WM.

For each WM to be issued when executing a WP, before signing its contents (and including that signature in the WM), the Sign subsystem generates the hash of the currently running WP and inserts it into the WM (or checks the hash if the WM already includes it), thus ensuring that the same hash is repropagated from message to message.

Advantageously, said WM includes the signature (certificate) by the manufacturer of the public key of the WN (corresponding to the private key of the WN by means of which said signature by the Sign subsystem has been generated). (The manufacturer's signature of these keys may be public and available, but may also be included in the WM in question).

Finally, in a particular embodiment, the network in question also comprises, in addition to (secure) WNs, non-secure WNs. At least with each "non-secure WN" corresponds at least one "control WN" WN able to validate its state variables modifications. Having at least one control WN that validates updates of state variables, makes it possible not to require that the non-secure WN of which it is a witness be implemented in a secure manner according to the SoC of the present invention, and offers yet other advantages, as described below. A non-secure WN can be implemented directly in a conventional computer or smartphone, or by leveraging generic security technologies such as ARM® TrustZone®.

We will now describe the WNs in detail by presenting its different characteristics.

With each WN is associated a public/private cryptographic key pair:
the private key is secret (ie hidden in the chip and not known outside the chip—it is either engraved in the chip as in TPM or smart cards, or stored in a secure manner, or automatically generated in the chip according to the "PUF" (Physically Unclonable Function) technology introduced in [P. S. Ravikanth, "Physical one-way functions", PhD Thesis, MIT, 2001] and [Pappu et al., "Physical one-way functions, Science, 297 (5589): 2026-2030, 2002] and implemented in particular in SoC FPGA Smartfusion2 and other Microsemi chips, or according to an analogous technique;
the public key is signed by the manufacturer (to certify that the chip is indeed a WN).
Each WM transmitted by a WN comprises, in addition to a message payload,
the hash of the WP which generated this WM;
the signature by this WN of said hash, as well as of the WM payload, to mean: "this message was generated by this WP running in this WN"—the public key corresponding to the private key used for this signature is also attached;
(and the public key, corresponding to the private key of the WN which has been used for this signature, is itself certified by the manufacturer as already mentioned—the WM may include this signature as well as the manufacturer's key).
Said signature (of said hash and WM payload) is performed by the Sign subsystem which generates said hash from the content of the WP being executed. The architecture of the system thus ensures that the hash in the WM is indeed the hash of the WP that generated it.

WNs come from the same manufacturer or a set of mutually agreed manufacturers. When a WM is received by a WN, the latter verifies that the public key used to decrypt said signature (deemed to be produced by the WN who transmitted this WM) is certified by an approved manufacturer (and ignores this WM if not).

Thus, the system and method of the invention ensure that, when a WN communicates a WM to a recipient WN (via the respective devices, such as smart phone or computer, to which they are coupled),
said WM has been generated by a WP whose hash is included in said WM itself;
the WM has not been tampered with—the integrity of the WM is guaranteed by the fact that the WM was signed by the WN which produced it and that this signature is certified by an approved manufacturer;
the authenticity of the WM is also guaranteed (because the signature key of the WN is certified by an approved manufacturer, that is to say, signed by that manufacturer)—this authenticity means not only that the WN is thus identified but also that this WN which is identified has correctly executed said WP to generate this WM.

The WN receiving the WM checks it and reacts to it by executing the same WP necessarily (this is described below when presenting the Check/Load subsystem).

If the WMs are encrypted (with the public key of the recipient WN) and not disclosed before they are decrypted by the recipient WN, a filtering whose purpose is to prevent their reception is discouraged (and from the moment these WMs are decrypted by the recipient WN, the Check/Load executable code is responsible for executing the same WP imposed by this decrypted WM, this is done automatically).

Each WN is paired with a device such as a smartphone under an Android® operating system or with a computer via appropriate input channels. Several embodiments are possible for this coupling, in particular:
the WN can be coupled to the smartphone via Wifi, Bluetooth, Bluetooth LE, NFC, etc. and any existing or future wireless communications technology,
the WN can be a component such as a part of Project ARA proposed by Google,
the WN can be implemented in a portable device according to the wired USB protocol or any existing or future wired communication technique.

Figure 5:
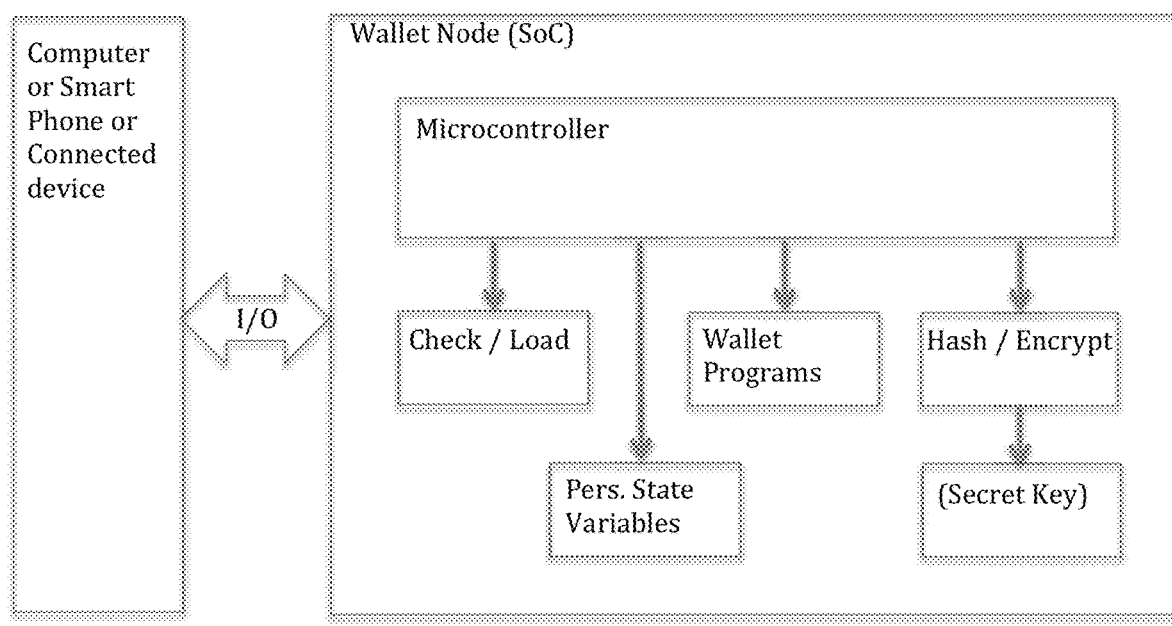

The WN is implemented here in the form of a chip having the following parts (subsystems) which are schematically represented in FIG. 5:
I/O
Microcontroller
Check/Load
Wallet Programs
Pers. State Variables
Sign
(Secret Key)

The WN is implemented as a "System on Chip" guaranteeing the non-alteration of the access restrictions (set out below) between its different parts, system to which inputs/outputs (I/O) are provided by a device (Computer or Smartphone) such as a smartphone or a computer.

Within the SoC is a microcontroller comprising a general-purpose processor (such as a processor implementing the ARM v7-M architecture) equipped with an internal memory. Only this processor can access the "Sign" part providing cryptographic functions, providing in particular the functionality of signature by the chip, the "Sign" part being in turn the only one able to access the part containing the secret key of the chip (Secret Key). Alternatively, the PUF technology (already mentioned above) makes it possible to avoid storing the secret key and generate it only on request (within the Sign part). In addition, manufacturers such as Microsemi provide yet other means (obfuscation means) to never see the secret key in extenso. These possible options are the reasons why the "secret key" part is shown in parentheses in the figure since in some implementation options the secret key is not stored.

The Wallet Programs part memorizes WPs and their respective hashes. The Microcontroller loads one of these WPs into its memory in a secure manner, depending on the hash of the incoming WM (or I/O input) as described below.

The WPs are able to manipulate persistent state variables in a non-volatile memory (Pers. State Variables) which are only accessible by the Microcontroller. The subsystem Pers. State Variables makes these Persistent State Variables accessible only for the execution of the respective specific WPs to which they belong. These state variables can thus be accessed/manipulated only (exclusively) by their respective WPs.

At power-up and power-reset, the executable code stored in the "Check/Load" part is the first to be loaded and executed in the Microcontroller, and then hashes are associated with the WPs available in the "Wallet Programs" part. When a WM arrives (via the I/O), this Check/Load part verifies its integrity and authenticity (the public key of the WN which is the sender of this WM is used to (i) decrypt the signature by this WN (ii) verify the integrity of the message and (iii) obtain the hash of the WP; the key of the manufacturer's certification signature is verified and the public key it certifies as a WN key is used to confirm the authenticity of the WM), the WP corresponding to said hash is selected, if available, in the "Wallet programs" part and loaded for execution. The issuance of WM, if any, by the said Wallet program, is performed by means of the Sign part which inserts or verifies the hash inserted in the WM in preparation before signing it. Advantageously, a "Manifest" declaring the inputs (via the "I/O" part) for a WP is associated with that WP; to each I/O input a WP hash is associated; and during an I/O input, its conformity (to the Manifest) is checked by the executable code "Check/Load" before the WP corresponding to said hash is selected, if available, in the "Wallet programs" part and loaded for execution.

As already said, as a variant the executable code that is loaded into the Microcontroller is not the entire WP whose hash is provided in the WM, but only a part (one module) of this WP, and to enable it the information provided in the WM may advantageously include, in addition to the hash of all such modules, the specification of the module(s) that are likely to react to the WM. (In this text, for simplicity and without this being limiting, it is assumed that the WP is loaded in its entirety.) In addition, WPs (or their modules) can be organized in versions; the hash of previous versions then accompany the WP's hash provided in the WM and, for each state variable (Persistent State Variables) stored in the chip, the hash of the version of the WP that has manipulated it last is associated with it. Thus the state variables of a WP can be updated by it even when its version evolves.

It should be noted that this chip can be implemented in a smart card, or in a ("customizable SoC FPGA") conventional SoC of the market such as SmartFusion® 2, from Microsemi, offering a securable Field Programmable Gate Array (FPGA) in which can advantageously be generated a secret key SRAM PUF ("Physically unclonable function (PUF) key enrollment and regeneration capability from Intrinsic ID") and which includes within the chip, in ASIC technology, a microcontroller (ARM® Cortex™-M3 processor implementing ARM v7-M architecture) with its internal memory.

Obviously, the architecture of the invention can also be implemented entirely in ASIC or in other chip manufacturing technologies.

Various examples of interactions between WN are described, in which a WP is triggered by the arrival of an I/O input from a smartphone with which a WN is coupled, this input I/O comprising the hash of the WP to be executed and input parameters, for example an amount or the address (or public key) of a recipient WN of a WM that is to be transmitted as well as the means of transmitting it (it is possible for example to send it by email). As already described, the "Check/Load" code checks the conformity of such an I/O input to the "Manifest" associated with the WP targeted by this I/O input before it is selected (in the Wallet Programs part) and loaded for execution. However, this selection and loading is made only if the WP in question is already stored. Thus, to simplify the description, it is considered that the WP targeted by the input in question is already stored.

A method of "anonymous identification" will first be described using the system and method of the invention.

According to [http://en.wikipedia.org/wiki/Biometric_passport], an electronic passport includes a chip allowing the passport data to be transferred by RFID wireless technology. The characteristics of the chip are documented in document 9303 of the International Civil Aviation Organization (ICAO). The chip contains a file (SOD) that stores the hashes of all the files stored in the chip (photo, fingerprints, etc.) and a digital signature of these hashes.

The digital signature is performed using a document signature key which is itself signed by a country signature key. RFID readers must have a list of all the country public keys used to check if the digital signature is generated by a country.

To simplify the description (the extension to the real case being trivial), suppose that an electronic passport includes an RFID chip (which can be read by an RFID reader), and that this chip presents the content of the passport signed by a government of which the public key is known, as well as this public key.

Thus, through the I/O part (from the smartphone of the passport owner, with which a WN is coupled), the following data is communicated to this WN:

the contents of the passport,
the government's signature of the passport content,
the government public key corresponding to this signature,
the address (the public key) of the recipient WN of the WM
  to be transmitted (to communicate the result of the
  anonymous identification to be carried out) and the communication mode of this WM to this recipient, in this case
  let's assume it's the TeleHash protocol (or analogous) and
  the WM is encrypted with the public key of the recipient
  WN,
the hash of the targeted WP (the anonymous identification
  application).

Check/Load analyses this I/O input, verifies that the WP's hash matches the stored WP (in Wallet Programs), and verifies that this input is conform with respect to the Manifest associated with this WP.

Once loaded into the Microcontroller, the WP is executed and performs the following steps:

1. Verify that the government's public key is authentic (checking if it is included in a list of known government public keys);
2. Check if the signature can be decrypted with this key;
3. Get the hash resulting from this decryption;
4. Check if the hash of the passport content is the same as the hash resulting from the decryption of the signature, and
5. Produce a WM for the specified recipient, with only this hash as anonymous identifier provided (the passport content is not revealed). In addition to this content itself, the WM includes the hash of the WP, as well as the signature by the WN of that content itself and that WP's hash.

As a result, the holder of the passport is identified with only the hash of the contents of this passport (and therefore anonymously).

Alternatively, instead of communicating (in the WM) the hash of the passport content, the WP communicates the hash of the {passport content+ another given string}, the latter may for example be the current month and year (in which case, the generated ID will only be used during the current month), thus offering a higher degree of anonymity. It should be noted that in this case, if this identifier is used several times in the same month, the user can not hide that it is the identification of the same person, which corresponds to the expected function of an identification.

Said recipient WN (receiver of said WM) will find this anonymous identifier within said received WM after having decrypted it (if the WM encryption option is adopted).

Here are the steps at reception of this WM (after having decrypted it):

Within the receiver WN, the Check/Load code selects the WP corresponding to the received (WP) hash and loads it into the Microcontroller. The WP is executed to communicate the anonymous identifier to the smartphone via the I/O.

Note that this same anonymous identification application from a passport can be done with only one WN for the holder of the passport (without needing a second WN for the receiver of the anonymous identifier), the WP communicating to the smartphone via the I/O the anonymous identifier of the passport holder, as well as the WP used, duly signed by the WN (whose key is certified by the manufacturer). The user of the smartphone to which the WN is coupled can then make use of this anonymous identifier by communicating it to a recipient by a means of his choice (for example by email) and this recipient can verify that the anonymous identifier was indeed generated by the good WP (not altered with respect to its hash) since generated in a WN that signed that is the case, that WN being itself trustworthy since certified by a trustworthy manufacturer whose key is itself verifiable. (But obviously, it's easier to go through a WN 2 that performs all these checks automatically.)

FIG. 5 schematically shows this process. It shows that the content of the passport read by RFID on the smartphone is provided to WN 1 via its I/O, with the hash-code "#Wallet Pgm". Upon receipt of this I/O input, the WN 1 executes the WP "Wallet Pgm" (whose hash is the one communicated in the same I/O input), for (i) verifying the signature of the government "Govt Signature" in the contents of the passport, (ii) generating the anonymous identifier "Anonymous ID" and finally (iii) issuing a WM "Wallet Msg" including "Anonymous ID" and the same hash "#Wallet Pgm" for WN 2. It is not illustrated in the figure that "Anonymous ID, #Wallet Pgm" is signed by WN 1, whose key is certified by the manufacturer (which can also be communicated in Wallet Msg), and that, advantageously, Wallet Msg can be encrypted with the public key of WN 2. Finally, WN 2 receives Wallet Msg (and decrypts it), so WN 2 selects the same WP "Wallet Pgm" which transmits Anonymous ID to the smartphone I/O to make it displayed ("Display the Anonymous ID").

In WN 1, instead of basing the identification on a digital signature of a government, the identification can of course be based on a signature supplied by a biometric identification device.

Now, a very simple method for transferring units of value from a first WN to a second WN will be described. It will be noted that securing the correct execution of WP at the level of the WN makes it impossible to "double-spend" (against which the blockchain technologies of Bitcoin and its descendents bring a solution—so the problem that these technologies are trying to solve, that is, their raison d'être, simply does not exist anymore).

Figure 6:
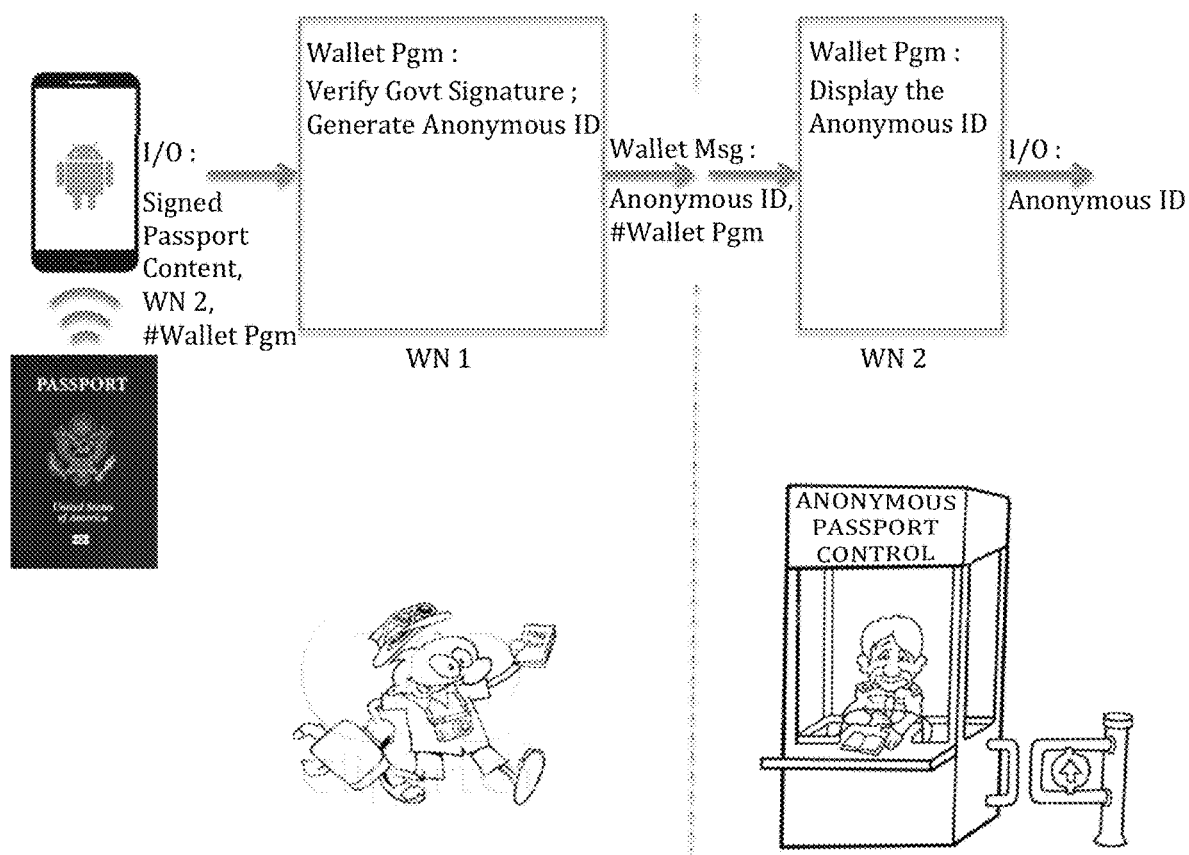

FIG. 6 shows schematically the case of a WP "Wallet Pgm" which in "WN 1" takes as a I/O input a transfer of 10 units of value in favor of "WN 2" and subtracts 10 units accordingly from a "Balance" state variable (representing the balance of units of value available in this WN). Here again, the figure does not show that in the "Wallet Msg" WM generated, the payload of the message "+10" and the hash "#Wallet Pgm" are signed by WN 1, whose signature key is certified by the manufacturer. The receiver (WN 2) of Wallet Msg responds by selecting (by Check/Load) the same WP "Wallet Pgm" which adds 10 units to its own "Balance" state variable and provides (to the smartphone to which it coupled) via the I/O the new value of the Balance variable as well as the source (WN 1) of its update.

Insofar as, automatically for each transfer of a given amount, a specific WP (in this case "Wallet Pgm") subtracts this amount in the "Balance" state variable (representing the available balance), and since only said specific WP can manipulate this state variable, a "double-spending" is impossible.

A "P2P Insurance" process will now be schematically described. Essentially it consists in two steps:
(1) a "helper" WN blocks a certain amount of units of value in favor of a "helped" WN and transmits to the "helped" WN a WM indicating that blocking and
(2) payment by "helper" WN (note that in the real case there will be several "helper" WN) on receipt of a "Claim" WM from a "helped" WN which includes a signature by an arbitrator (as required by the running WP) to validate the Claim in question.

Figure 7:
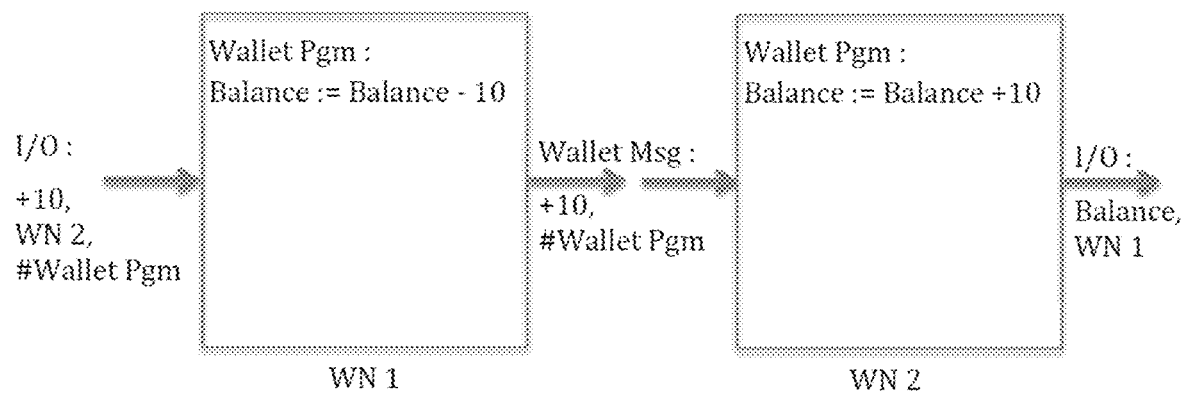

FIG. 7 schematically shows these two steps: the blocking step and the step of payment on presentation of the Claim.

In the blocking step (Step 1), WN 1 blocks 10 units of value as a potential help for WN 2. Thus, the WP "p2pInsurance" increases the state variable Refill[WN2] by 10 units of values (WN2 meaning WN 2) and generates the WM "Wallet Msg 1" informing WN 2 of this potential help of +10. WN 2 receives it, decrypts it and the WP "p2pInsurance" updates on the one hand a state variable storing that WN 1 potentially helps it (for +10 and on the other hand a "Help" state variable (i.e. the total potential help) in order to increase it by 10.

The step of payment on presentation of "Claim" (Step 2) is initiated by the "helped" Wallet Node WN 2 which beforehand collects the signature of the arbitrator, for a Claim of 5 units of value to be paid to WN 3, and notifies the helpers, in this case WN 1 only (by the WM "Wallet Msg 2") which includes the said arbiter signature and the amount of the Claim in question. As soon as Wallet Msg 2 is received and decrypted, and the hash "#p2pInsurance" is found in it, WN 1's Check/Load code selects the WP "p2pInsurance" (having this hash #p2pInsurance), which after having verified the said signature of the arbitrator, transfers 5 units of value to WN 3.

In the implemented protocol, the helper WN (WN 1) can not shirk his commitments (to pay in case of a "Claim" justified by signature of the arbitrator). Indeed, on the one hand the WM "Wallet message 2" received is encrypted, so there is no way of knowing if this is a payment request message (it could also be a payment in favor of WN 1, for example), and on the other hand the WMs are regularly re-sent as long as the receiver has not confirmed reception (by a Receipt Ack, as described below). The user who receives these WMs can not know which message they convey nor can she know that it is the same WM that is re-sent (or if it is a brand new WM), since all WMs are encrypted.

Using a Nonce for Receipt Ack

Figure 8:
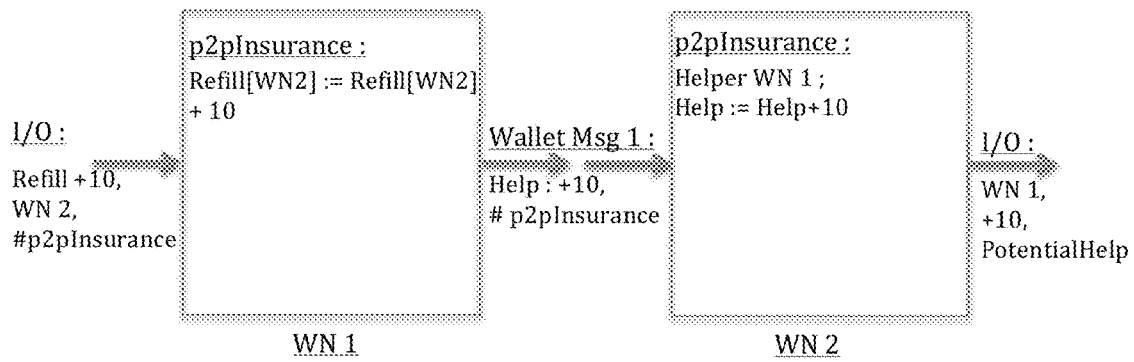
Figure 8:
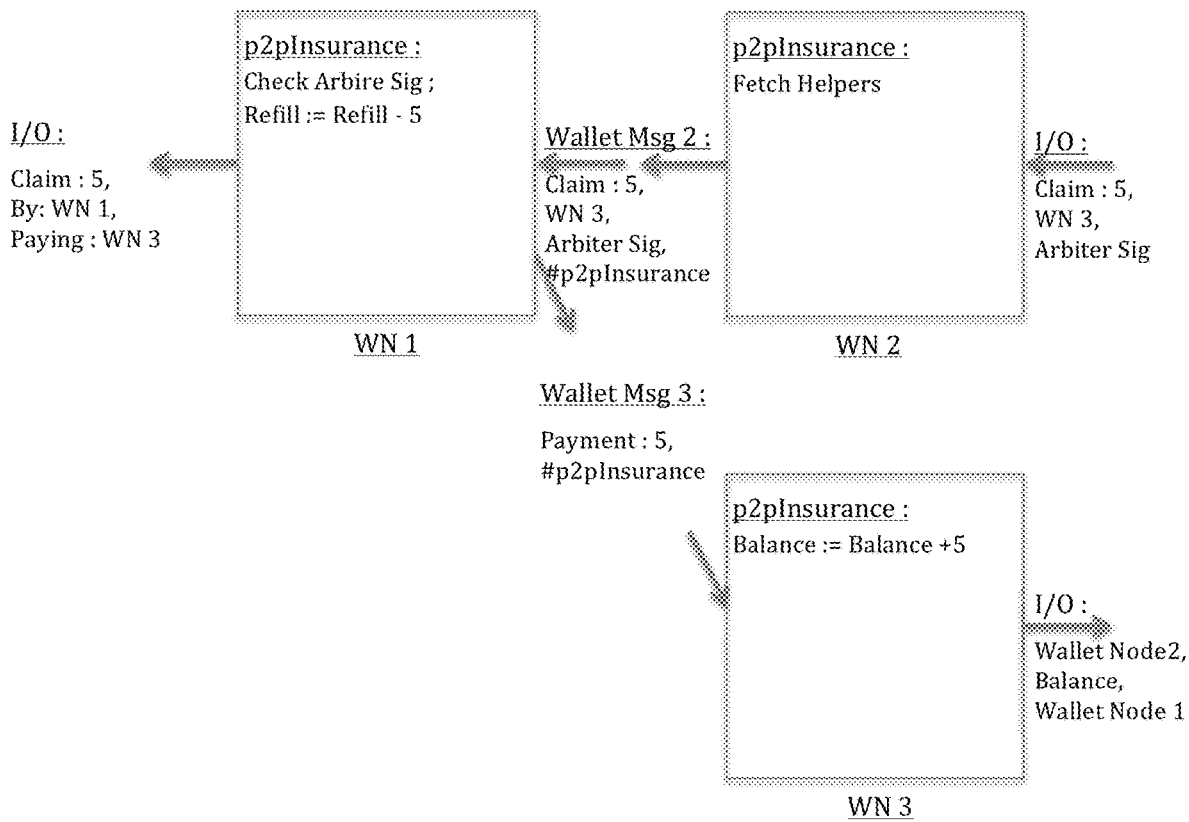

FIG. 8 shows schematically the reception by a "ReceiverWN" WN of a WM. That WN is encrypted with the ReceiverWN's public key (which is not shown in the figure) and includes a cryptographic nonce (a random number used only once). The Receipt Ack "ACK" that the ReceiverWN returns reproduces this nonce and thus demonstrates that ReceiverWN has received the specific WM in question. ACK can also be encrypted (with the public key of SenderWN, the transmitter of the WM in question). FIG. 8 also shows that an issued WM includes the signature of the WN that sends it. What this figure does not show is that the WMs also normally (preferably) include the signature by the manufacturer of the public key of the sender WN (ie the manufacturer's certificate).

Finally, as already mentioned, the WMs are (preferably) re-transmitted regularly as long as the acknowledgments (ACK) are not received in return.

Moreover, as already described above, the use of a registry, which the WNs are required to consult regularly, allows to prove the sending of a WM by inserting it in the registry.

We will now describe an architecture comprising, in addition to the (secure) WNs as described, "control WNs" (or "witness WNs") whose role is to testify to the correct execution of the WPs in "base WNs", whether they are secure or not.

Thus, at least one control WN i' is associated with each base WN i (secured or not) issuing WM. When a base WN receives an I/O input, it notifies the control WN(s) assigned to it. The control WN(s) then executes the same WP, which if necessary manipulates state variables and issues WMs. Updates of sate variables in the base WNs are also notified to the control WNs. The matching between the results of the execution and the said notifications is checked. A mismatch, if any, invalidates the operation of the corresponding base WN.

The control WN can be randomly selected in a DHT [https://en.wikipedia.org/wiki/Distributed_hash_table] and one or more control WN can be assigned randomly (and blindly) to each WN.

The control WN may be specifically generated or selected by the manufacturer(s).

Figure 9:
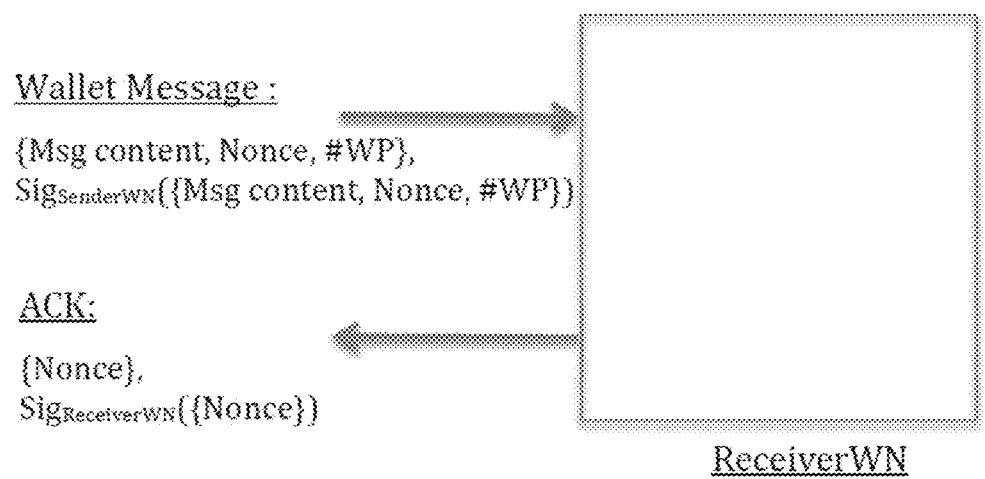
FIG. 9 illustrates the usage of a cryptographic nonce in relation to a Wallet Node.
Figure 10:
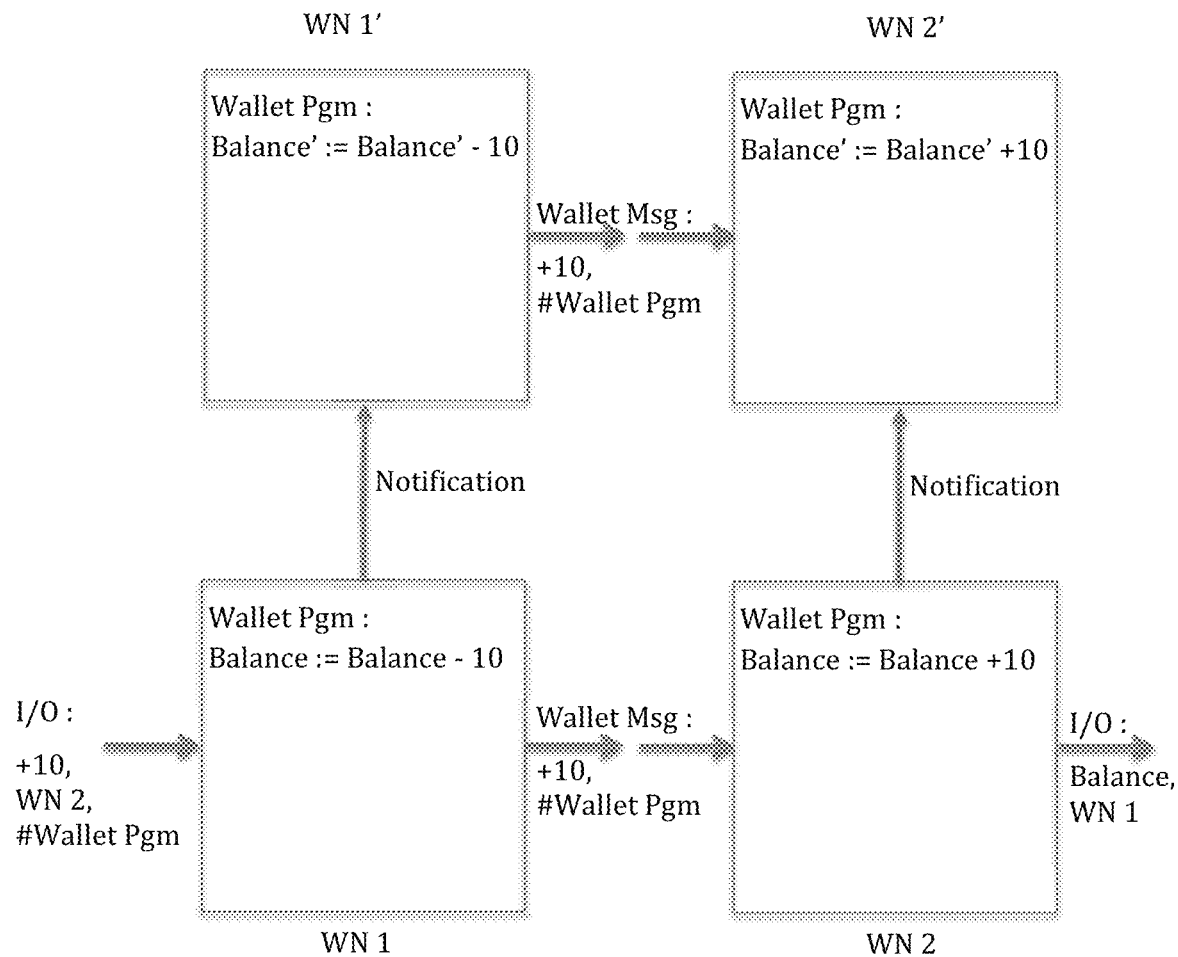
FIG. 10 illustrates a method of transferring units of account between Wallet Nodes which also involves "control" Wallet Nodes.

FIG. 9 shows the payment example shown in FIG. 6, but with the respective control WNs, WN 1' and WN 2'. The I/O input triggering the execution of Wallet Pgm, as well as each operation on the state variables of WN 1 and 2, are communicated to the corresponding control WNs (this is represented by the "Notification" arrow). The control WNs execute the same Wallet Programs, update the same state variables (but not necessarily on the same values, as described below) and send the same WM as their corresponding WN. The results of the treatments are compared with the said notifications for validation. This scheme can be applied to basic WNs that are secure or not.

Advantageously, homomorphic encryption techniques can be implemented so as not to reveal to the witnesses (i.e. to the control WNs) the values in the state variables.

It is also possible, in some WPs, to implement a simple translation of values in the state variables such as "Balance" (balance). Thus, in this approach, in FIG. 9, the "Balance" state variables of WN 1' and WN 2' respectively are not initialized to the same values as the respective initial values of "Balance" in WN 1 and WN 2. When the operations on the state variables of Wallet Node 1 and Wallet Node 2 are communicated to the corresponding control WNs (communication represented by the arrow "Notification"), the current values of these state variables are not communicated, only operations such as −10 and +10 are.

Such a system and process architecture where control WNs confirm basic WN execution results, allows to relax security requirements in the hardware. It is then possible to tolerate in a set of WN a certain number of WN which are not secure within the meaning of the present invention, in particular those whose amounts are relatively small and limited. Another advantage of such an architecture is that the control WN can be used to keep data that the owners of basic WN (secure or not) can avail themselves in case of loss.

Finally, it will be noted that a set of WN forming a community can use a set of "WN sequencers" to order their operations when it is necessary to memorize their results in an ordered manner in a shared (and possibly distributed) database, such as a hash-chained list or a blockchain. Said community elects an odd number of WN sequencers to jointly provide the desired sequencing service. A request for a sequence number can be submitted by a WN to any WN sequencer. In case of non-response, the WN requests a sequence number from the next WN sequencer available in the list of WN sequencers. They decide how to assign sequence numbers to each other, as follows:

When a sequence request is received by a WN sequencer, the WN sequencer proposes to the other WN sequencers the sequence number following the last known sequence number used, If this proposal comes before another sequence number request, then it is approved, otherwise it is rejected, When the number of approvals is greater than half the number of WN sequencers accessible, the proposed sequence number is assigned.

The algorithm of this method can be as shown in appendix A.

---

APPENDIX A

```
SequencerNode {
List<SequencerNode> otherSequencerNodes;
int nextSequenceNumber = 0;
synchronized int getSequenceNumber( ) {
int votes = 0;
while ( votes < (otherSequencerNodes.size( ) + 1)/2) {
nextSequenceNumber++;
vote = 1;
for ( SequencerNode sn : otherSequencerNodes) {
int v = sn.getApproval(nextSequenceNumber);
votes += v;
}
}
return nextSequenceNumber;
}
synchronized int getApproval( int nextN ) {
int result = 0;
if (nextN > this.nextSequenceNumber) {
result = 1;
this.nextSequenceNumber = nextN ;
}
return result;
}
}
```

---

The invention claimed is:

1. A system for certifying goods in a logistic or transformation chain, wherein a tag capable of containing certifications performed at different stages of the chain is associated to respective goods, the system comprising:
- a set of pieces of equipment that each include a processor and are distributed on the chain and each being configured with a wallet node (WN), and in that the wallet nodes each comprises a wallet program (WP) that is configured to cause the processors of the equipment to securely perform:
- a transfer of tag ownership from an owning wallet node (OWN) to another wallet node, where only one wallet node can own a tag at a given time,
- a transfer of tag control from a so called viewing wallet node (VWN) to another wallet node, wherein only one wallet node can control a tag a given time,
- so as to certify both the authenticity of a good and its location in the chain.

2. The system according to claim 1, wherein a given viewing wallet node of a tag is capable of responding to a query by generating a message containing information representative of the fact that the tag is under control of said viewing wallet node, of the identity of an initial owning wallet node, of the identity of an wallet node from which the control of said tag was transferred, and the status of control requests by other wallet nodes.

3. The system according to claim 1, wherein at least certain tags are associated with a non-physical resource and each contain a priority timestamp giving it priority, the content of each tag being stored in a publicly accessible register.

4. The system according to claim 3, wherein the publicly accessible register is a distributed hash table (DHT).

5. The system according to claim 1, wherein a wallet node owning a tag is capable of storing an address of the current viewing wallet node.

6. The system according to claim 5, wherein the address of the current viewing wallet node is store in the tag.

7. The system according to claim 1, wherein the tags can be modified to include further certifications.

8. The system according to claim 1, wherein at least certain certifications are capable of certifying predefined transformations of the respective goods.

9. The system according to claim 1, wherein each tag contains the address of the wallet node currently owning the tag.

10. The system according to claim 1, wherein at least certain tags are contained in labels attached to physical products, each label bearing a machine-readable code derived from the tag content.

11. The system according to claim 1, wherein at least certain tags are in the form of metadata associated with a created non-material resource such as a document, file, group of files, etc., to identify it, to detect illicit reproductions or uses, etc.

12. A system for certifying goods in a logistic or transformation chain, wherein a tag capable of containing certifications performed at different stages of the chain is associated to each good, the system comprising:
- an equipment including a storage device for storing in a tag data that are uniquely representative of physical, chemical or optical properties of the good on the basis of a corresponding analysis at said equipment of a region of the good where the tag is affixed, these data being subsequently accessible in order to check whether the tag has remained associated with the same good on the basis of identical or equivalent analyses.

13. The system according to claim 12, wherein the analysis is performed with a portable device, and further comprising means for positioning the portable device in a reference position relative to the good when the analysis is made with the device.

14. The system according to claim 13, wherein said analysis comprises an image analysis of a picture taken with a camera of said portable device.

15. The system according to claim 13, wherein said analysis comprises a molecular analysis by near infrared spectroscopy.

* * * * *